US010047189B2

(12) United States Patent
Kobata et al.

(10) Patent No.: US 10,047,189 B2
(45) Date of Patent: Aug. 14, 2018

(54) BLOCK POLYISOCYANATE COMPOUND

(75) Inventors: Masami Kobata, Hiratsuka (JP);
Hiroshi Kitagawa, Hiratsuka (JP);
Kazuaki Kitazono, Hiratsuka (JP)

(73) Assignee: KANSAI PAINT CO., LTD., Hyogo (JP)

( * ) Notice: Subject to any disclaimer, the term of this patent is extended or adjusted under 35 U.S.C. 154(b) by 0 days.

(21) Appl. No.: 14/110,168

(22) PCT Filed: Apr. 5, 2012

(86) PCT No.: PCT/JP2012/059396
§ 371 (c)(1),
(2), (4) Date: Oct. 7, 2013

(87) PCT Pub. No.: WO2012/137881
PCT Pub. Date: Oct. 11, 2012

(65) Prior Publication Data
US 2014/0031484 A1 Jan. 30, 2014

(30) Foreign Application Priority Data

Apr. 8, 2011 (JP) ................ 2011-086171

(51) Int. Cl.
*C08G 18/80* (2006.01)
*C09D 133/12* (2006.01)
*C08G 18/48* (2006.01)
*C08G 18/62* (2006.01)
*C08G 18/70* (2006.01)
*C08G 18/79* (2006.01)
*C08G 18/28* (2006.01)
*C09D 175/04* (2006.01)
*C08G 18/40* (2006.01)
*C08G 18/42* (2006.01)

(52) U.S. Cl.
CPC ....... *C08G 18/8096* (2013.01); *C08G 18/283* (2013.01); *C08G 18/4063* (2013.01); *C08G 18/423* (2013.01); *C08G 18/4833* (2013.01); *C08G 18/6254* (2013.01); *C08G 18/706* (2013.01); *C08G 18/792* (2013.01); *C08G 18/8048* (2013.01); *C08G 18/8093* (2013.01); *C09D 133/12* (2013.01); *C09D 175/04* (2013.01); *C08L 2201/54* (2013.01)

(58) Field of Classification Search
CPC ............ C08G 18/8096; C08G 18/4833; C08G 18/6254; C08G 18/706; C08G 18/792; C08G 18/8048; C08G 18/8093; C08G 18/4063; C08G 18/423; C08G 18/283; C08G 18/80; C09D 133/12; C09D 175/04; C09D 33/12; C09D 75/04; C08L 2201/54
USPC .................... 524/507, 538; 528/45
See application file for complete search history.

(56) References Cited

U.S. PATENT DOCUMENTS 2,167,168 A 7/1939 Boese
5,747,558 A * 5/1998 Nishi ............ B05D 7/57
523/201
6,274,693 B1 8/2001 Poth et al.
2002/0165335 A1 11/2002 Kobata et al.
2004/0234464 A1 11/2004 Herve
2006/0276611 A1* 12/2006 Katamura ............ C07C 265/16
528/44
2012/0316291 A1 12/2012 Yamauchi et al.

FOREIGN PATENT DOCUMENTS

| JP | 2000-290493 A | 10/2000 | |
| JP | 2000-327647 A | 11/2000 | |
| JP | 2002-322238 A | 11/2002 | |
| JP | 2004-26958 A | 1/2004 | |
| JP | 2006-160936 A | 6/2006 | |
| JP | WO 2007126134 A1 * | 11/2007 | ............ C08L 51/003 |
| JP | 2009-155409 A | 7/2009 | |
| JP | 2009155409 A * | 7/2009 | |
| JP | 2009-191127 A | 8/2009 | |
| JP | 2011256232 A * | 12/2011 | |
| WO | 2011/096559 A1 | 8/2011 | |

OTHER PUBLICATIONS

JP 2009-191127 A (2009), machine translation. JPO Advanced Industrial Property Network (AIPN).*
JP 2011-256232 A (2011), machine translation, JPO/INPIT Japan Platform for Patent Information (J-PlatPat).*
JP 2009-155409 A (2009), machine translation. JPO Japan Platform for Patent Information (J-PlatPat).*
WO 2007/126134 A1 (2007), machine translation, JPO Japan Platform for Patent Information (J-PlatPat).*
International Search Report dated Jun. 22, 2012 issued in corresponding PCT/JP2012/059396 application (pp. 1-2).
English Translation Abstract of JP 2000-290493 published Oct. 17, 2000.
English Translation Abstract of JP 2000-327647 published Nov. 28, 2000.
English Translation Abstract of JP 2004-026958 published Jan. 29, 2004.
English Translation Abstract of JP 2006-160936 published Jun. 22, 2006.
English Translation Abstract of JP 2009-155409 published Jul. 16, 2009.
English Translation Abstract of JP 2009-191127 published Aug. 27, 2009.
Supplementary European Search Report dated Jul. 31, 2014 issued in corresponding EP 12767670.8 application (pp. 1-4).
English Translation of JP 2004-026958 A published Jan. 29, 2004.
English Translation of JP 2009-155409 A published Jul. 16, 2009.

* cited by examiner

*Primary Examiner* — Josephine L Chang
(74) *Attorney, Agent, or Firm* — Millen White Zelano and Branigan, PC; John Sopp

(57) ABSTRACT

It is an object of the invention to provide a block polyisocyanate compound with excellent storage stability. The block polyisocyanate compound of the invention has the following construction. A block polyisocyanate compound having at least one block isocyanate group selected from the group consisting of a block isocyanate group represented by formula (I), block isocyanate group represented by formula (II) and block isocyanate group represented by formula (III), and a hydrophilic group.

4 Claims, No Drawings

BLOCK POLYISOCYANATE COMPOUND

TECHNICAL FIELD

The present invention relates to a block polyisocyanate compound, to an aqueous coating composition containing the block polyisocyanate compound, and to a coated article obtained by coating the aqueous coating composition.

BACKGROUND ART

In recent years, heat curable coating materials have been desired that cure at lower temperatures, from the viewpoint of reducing the energy levels used during heating. To meet this demand, heat curable coating materials containing block polyisocyanate compounds in which isocyanate groups are blocked with active methylene compounds such as acetoacetic acid esters and malonic acid diesters, are promising as curing agents because they cure at relatively low temperatures.

Also, conversion of coating materials to aqueous forms has also been desirable in recent years from the viewpoint of reducing environmental pollution by volatilization of organic solvents.

However, when a block polyisocyanate compound is used having isocyanate groups blocked with an active methylene compound for an aqueous coating material, the storage stability has often been reduced. Specifically, if an aqueous coating material containing a block polyisocyanate compound in which isocyanate groups are blocked with an active methylene compound is coated after storage, the adhesion of the coating film that is formed is often reduced. This is believed to be due to dissociation of the active methylene compound in the block polyisocyanate compound during storage of the aqueous coating material, and reaction of the generated isocyanate groups with water in the aqueous coating material resulting in inactivation, whereby the curability of the aqueous coating material after storage is reduced.

In addition, coating materials are generally desired that can form coating films with excellent smoothness and sharpness.

For example, PTL 1 teaches that a block polyisocyanate compound with two different active methylene-based compounds with specific structures as blocking agents can form a crosslinked coating film at 90° C. or below, and has excellent storage stability in the presence of moisture.

CITATION LIST

Patent Literature

PTL 1 Japanese Unexamined Patent Publication No. 2009-191127

SUMMARY OF INVENTION

Technical Problem

Even with the block polyisocyanate compound described in PTL 1, however, the storage properties in the presence of moisture have often been inadequate. Furthermore, when an aqueous coating composition containing the block polyisocyanate compound described in PTL 1 is coated after storage, the adhesion of the formed coating film is often reduced.

It is therefore an object of the present invention to provide a block polyisocyanate compound with excellent storage stability. It is another object of the invention to provide an aqueous coating composition that can form a coating film with excellent smoothness and sharpness, and that can also form a coating film with excellent adhesion even when coated after storage, as well as an article coated with the aqueous coating composition.

Solution to Problem

The present inventors have avidly conducted research with the object of solving the problems described above. As a result, it was found that the aforementioned object can be achieved by a block polyisocyanate compound having a block isocyanate group with a specific structure and a hydrophilic group.

Specifically, the invention provides the block polyisocyanate compound described below, an aqueous coating composition containing the block polyisocyanate compound, and a coated article obtained by coating the aqueous coating composition, and it relates to the following [J1] to [J7].

[J1]

A block polyisocyanate compound having at least one block isocyanate group selected from the group consisting of a block isocyanate group represented by the following formula (I):

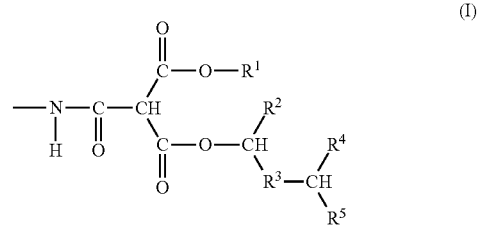

wherein $R^1$, $R^2$, $R^4$ and $R^5$ each independently represent a C1-12 hydrocarbon group and $R^3$ represents a C1-12 straight or branched alkylene group, a block isocyanate group represented by the following formula (II):

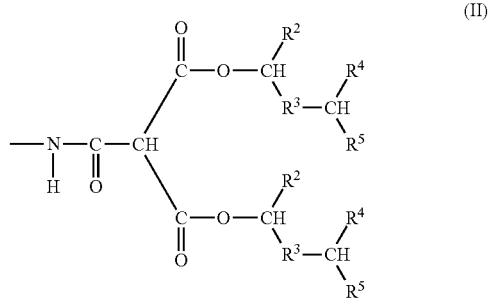

wherein $R^2$, $R^3$, $R^4$ and $R^5$ are as defined above, and a block isocyanate group represented by the following formula (III):

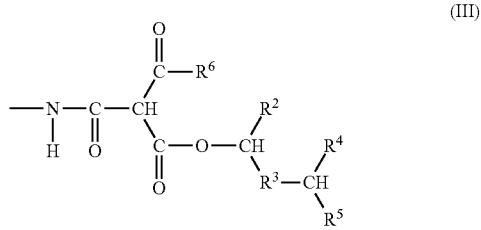

wherein $R^2$, $R^3$, $R^4$ and $R^5$ are as defined above, and $R^6$ represents a C1-12 hydrocarbon group, and a hydrophilic group.

[J2]
The block polyisocyanate compound according to J1, wherein $R^1$ in formula (I) is an isopropyl group.
[J3]
The block polyisocyanate compound according to J1 or J2, wherein $R^6$ in formula (III) is an isopropyl group.
[J4]
The block polyisocyanate compound according to J1 or J2, wherein the block polyisocyanate compound is produced by reacting a block polyisocyanate compound precursor ($b_{41}$) having a block isocyanate group represented by the following formula (IV):

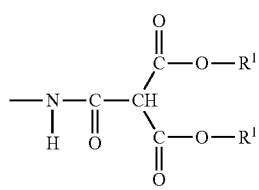
(IV)

wherein $R^1$ groups are as defined above and may be the same or different,
and a hydrophilic group,
and a secondary alcohol ($b_5$) represented by the following formula (VI):

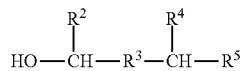
(VI)

wherein $R^2$, $R^3$, $R^4$ and $R^5$ are as defined above.
[J5]
The block polyisocyanate compound according to J1 or J3, wherein the block polyisocyanate compound is produced by reacting a block polyisocyanate compound precursor ($b_{42}$) having a block isocyanate group represented by the following formula (V):

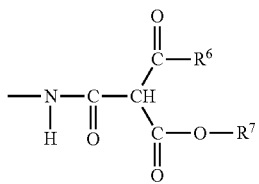
(V)

wherein $R^6$ is as defined above and $R^7$ represents a C1-12 hydrocarbon group,
and a hydrophilic group,
and a secondary alcohol ($b_5$) represented by the following formula (VI):

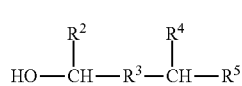
(VI)

wherein $R^2$, $R^3$, $R^4$ and $R^5$ are as defined above.

[J6]
An aqueous coating composition comprising a block polyisocyanate compound according to any one of J1 to J5, and a hydroxyl-containing resin (A).
[J7]
An article with a coating film, obtained by coating an article to be coated with the aqueous coating composition according to J6.

Advantageous Effects of Invention

The block polyisocyanate compound of the invention has excellent storage stability. In addition, an aqueous coating composition containing the block polyisocyanate compound has excellent storage stability and can form a coating film with excellent smoothness and sharpness. Furthermore, the aqueous coating composition can form a coating film with excellent adhesion even when it is coated after storage.

DESCRIPTION OF EMBODIMENTS

The block polyisocyanate compound of the invention will now be explained in detail.

The block polyisocyanate compound of the invention has at least one block isocyanate group selected from the group consisting of a block isocyanate group represented by the following formula (I):

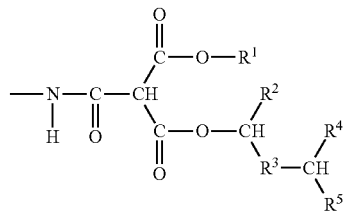
(I)

wherein $R^1$, $R^2$, $R^4$ and $R^5$ each independently represent a C1-12 hydrocarbon group and $R^3$ represents an approximately C1-12 straight or branched alkylene group, a block isocyanate group represented by the following formula (II):

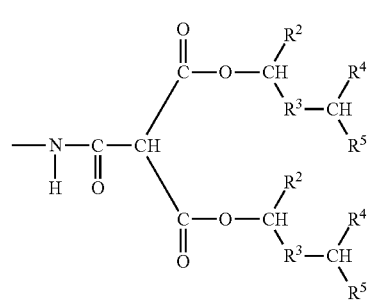
(II)

wherein $R^2$, $R^3$, $R^4$ and $R^5$ are as defined above, and a block isocyanate group represented by the following formula (III):

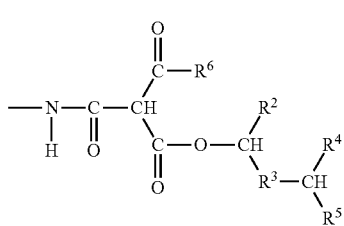

(III)

wherein $R^2$, $R^3$, $R^4$ and $R^5$ are as defined above, and $R^6$ represents an approximately C1-12 hydrocarbon group, and a hydrophilic group.

The block polyisocyanate compound can be obtained, for example, by reacting an active hydrogen-containing compound having a hydrophilic group (b2) and an active methylene compound (b$_3$) with the isocyanate groups of a polyisocyanate compound (b$_1$) having two or more isocyanate groups in the molecule, to obtain a block polyisocyanate compound precursor having a hydrophilic group (b4), and then reacting the block polyisocyanate compound precursor having a hydrophilic group (b4) with a secondary alcohol (b$_5$).

When the isocyanate groups of the polyisocyanate compound (b$_1$) are to be reacted with an active hydrogen-containing compound (b2) having the hydrophilic group and an active methylene compound (b$_3$), the order of reacting the isocyanate groups with the polyisocyanate compound (b$_1$), the active hydrogen-containing compound having a hydrophilic group (b2) and an active methylene compound (b$_3$) is not particularly restricted.

Specifically, there may be mentioned (i) a method of reacting an active hydrogen-containing compound having a hydrophilic group (b2) with some of the isocyanate groups in a polyisocyanate compound (b$_1$), and then blocking the remaining isocyanate groups with an active methylene compound (b$_3$), (ii) a method of blocking some of the isocyanate groups in a polyisocyanate compound (b$_1$) with an active methylene compound (b$_3$), and then reacting an active hydrogen-containing compound having a hydrophilic group (b2) with the remaining isocyanate groups, and (iii) a method of simultaneously reacting an active hydrogen-containing compound having a hydrophilic group (b2) and an active methylene compound (b$_3$) with the isocyanate groups in a polyisocyanate compound (b$_1$).

[Polyisocyanate Compound (b$_1$)]

The polyisocyanate compound (b$_1$) is a compound with at least two isocyanate groups in the molecule, and examples include aliphatic polyisocyanates, alicyclic polyisocyanates, aromatic/aliphatic polyisocyanates, aromatic polyisocyanates, and their derivatives, as well as combinations of the foregoing.

Examples of aliphatic polyisocyanates include aliphatic diisocyanates such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, dimer acid diisocyanate and methyl 2,6-diisocyanatohexanoate (common name: lysine diisocyanate); and aliphatic triisocyanates such as 2-isocyanatoethyl 2,6-diisocyanatohexanoate, 1,6-diisocyanato-3-isocyanatomethyl- hexane, 1,4,8-triisocyanatooctane, 1,6,11-triisocyanatoundecane, 1,8-diisocyanato-4-isocyanatomethyloctane, 1,3,6-triisocyanatohexane and 2,5,7-trimethyl-1,8-diisocyanato-5-isocyanatomethyloctane.

Examples of alicyclic polyisocyanates include alicyclic diisocyanates such as 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (common name: isophorone diisocyanate), 4-methyl-1,3-cyclohexylene diisocyanate (common name: hydrogenated TDI), 2-methyl-1,3-cyclohexylene diisocyanate, 1,3- or 1,4-bis(isocyanatomethyl)cyclohexane (common name: hydrogenated xylylene diisocyanate) or mixtures thereof, methylenebis(4,1-cyclohexanediyl)diisocyanate (common name: hydrogenated MDI) and norbornane diisocyanate; and alicyclic triisocyanates such as 1,3,5-triisocyanatocyclohexane, 1,3,5-trimethylisocyanatocyclohexane, 2-(3-isocyanatopropyl)-2,5-di(isocyanatomethyl)-bicyclo(2.2.1) heptane, 2-(3-isocyanatopropyl)-2,6-di(isocyanatomethyl)-bicyclo(2.2.1)heptane, 3-(3-isocyanatopropyl)-2,5-di(isocyanatomethyl)-bicyclo(2.2.1)heptane, 5-(2-isocyanatoethyl)-2-isocyanatomethyl-3-(3-isocyanatopropyl)-bicyclo(2.2.1)heptane, 6-(2-isocyanatoethyl)-2-isocyanatomethyl-3-(3-isocyanatopropyl)-bicyclo(2.2.1)heptane, 5-(2-isocyanatoethyl)-2-isocyanatomethyl-2-(3-isocyanatopropyl)-bicyclo(2.2.1)-heptane and 6-(2-isocyanatoethyl)-2-isocyanatomethyl-2-(3-isocyanatopropyl)-bicyclo(2.2.1)heptane.

Examples of aromatic/aliphatic polyisocyanates include aromatic/aliphatic diisocyanates such as methylenebis(4,1-phenylene)diisocyanate (common name: MDI), 1,3- or 1,4-xylylene diisocyanate or mixtures thereof, ω,ω'-diisocyanato-1,4-diethylbenzene and 1,3- or 1,4-bis(1-isocyanato-1-methylethyl)benzene (common name: tetramethylxylylene diisocyanate) or mixtures thereof; and aromatic/aliphatic triisocyanates such as 1,3,5-triisocyanatomethylbenzene.

Examples of aromatic polyisocyanates include aromatic diisocyanates such as m-phenylene diisocyanate, p-phenylene diisocyanate, 4,4'-diphenyl diisocyanate, 1,5-naphthalene diisocyanate, 2,4-tolylene diisocyanate (common name: 2,4-TDI) or 2,6-tolylene diisocyanate (common name: 2,6-TDI), or mixtures thereof, 4,4'-toluidine diisocyanate and 4,4'-diphenyl ether diisocyanate; aromatic triisocyanates such as triphenylmethane-4,4',4"-triisocyanate, 1,3,5-triisocyanatobenzene and 2,4,6-triisocyanatotoluene; and aromatic tetraisocyanates such as 4,4'-diphenylmethane-2,2',5,5'-tetraisocyanate.

Examples of the aforementioned derivatives include the aforementioned polyisocyanate dimers, trimers, biurets, allophanates, urethodiones, urethoimines, isocyanurates, oxadiazinetriones and the like, as well as polymethylenepolyphenyl polyisocyanate (crude MDI, polymeric MDI) and crude TDI.

As the polyisocyanate compound (b$_1$) there are preferred aliphatic diisocyanates, alicyclic diisocyanates and their derivatives, since the obtained block polyisocyanate compound will be resistant to yellowing during heating. As the polyisocyanate compound (b$_1$) there are more preferred aliphatic diisocyanates and their derivatives, from the viewpoint of increasing the flexibility of the coating film that is formed.

The polyisocyanate compound (b$_1$) includes prepolymers produced by reacting aliphatic polyisocyanates, alicyclic polyisocyanates, aromatic/aliphatic polyisocyanates, aromatic polyisocyanates, and their derivatives, as well as any combinations of the foregoing, with compounds that can react with such polyisocyanates, under conditions with an excess of isocyanate groups. Examples of compounds that can react with the aforementioned polyisocyanates include compounds with active hydrogen groups such as hydroxyl and amino, and specific examples include polyhydric alcohols, low molecular weight polyester resins, amines, water and the like.

Also, the polyisocyanate compound ($b_1$) includes polymers of isocyanate group-containing polymerizable unsaturated monomers, or copolymers of such isocyanate group-containing polymerizable unsaturated monomers and polymerizable unsaturated monomers other than the isocyanate group-containing polymerizable unsaturated monomers.

The polyisocyanate compound ($b_1$) has a number-average molecular weight of preferably about 300 to about 20,000, more preferably about 400 to about 8,000 and even more preferably about 500 to about 2,000, from the viewpoint of reactivity of the block polyisocyanate compound that is to be obtained and compatibility between the block polyisocyanate compound and the other coating material components.

The polyisocyanate compound ($b_1$) also preferably has a mean number of isocyanate functional groups in the molecule in the range of about 2 to about 100, from the viewpoint of reactivity of the block polyisocyanate compound that is to be obtained and compatibility between the block polyisocyanate compound and the other coating material components. The mean number of isocyanate functional groups is more preferably at least 3 or greater from the viewpoint of increasing the reactivity of the block polyisocyanate compound that is to be obtained. The mean number of isocyanate functional groups is also more preferably 20 or less from the viewpoint of preventing gelling during production of the block polyisocyanate compound.

[Active Hydrogen-Containing Compound Having a Hydrophilic Group (b2)]

The active hydrogen-containing compound having a hydrophilic group (b2) may be an active hydrogen-containing compound with a nonionic hydrophilic group, an active hydrogen-containing compound with an anionic hydrophilic group, an active hydrogen-containing compound with a cationic hydrophilic group, or any desired combination of these. The active hydrogen-containing compound having a hydrophilic group (b2) is preferably an active hydrogen-containing compound having a nonionic hydrophilic group, in order to minimize inhibition of the reaction of blocking the isocyanate groups in the polyisocyanate compound ($b_1$) with the active methylene compound ($b_2$) described hereunder.

Examples of active hydrogen-containing compounds having nonionic hydrophilic groups include active hydrogen-containing compounds having polyoxyalkylene groups. Examples of polyoxyalkylene groups include polyoxyethylene, polyoxypropylene and polyoxyethyleneoxypropylene. The active hydrogen-containing compound having a nonionic hydrophilic group preferably has a polyoxyethylene group, from the viewpoint of storage stability after aqueous dispersion of the block polyisocyanate compound that is to be obtained.

The active hydrogen-containing compound having a polyoxyethylene group has about 3 or more, preferably about 5 to about 100 and even more preferably about 8 to about 45 contiguous polyoxyethylenes, or in other words it has polyoxyethylene blocks, from the viewpoint of storage stability after aqueous dispersion of the block polyisocyanate compound that is to be obtained, and water resistance of the coating film that is to be formed.

The active hydrogen-containing compound having a polyoxyethylene group may also contain oxyalkylene groups other than oxyethylene groups, in addition to the polyoxyethylene blocks. Examples of oxyalkylene groups other than the oxyethylene groups include oxypropylene, oxybutylene and oxystyrene.

The molar ratio of oxyethylene groups among the oxyalkylene groups in the active hydrogen-containing compound having polyoxyethylene groups is preferably in the range of about 20 to about 100 mol % and more preferably in the range of about 50 to about 100 mol %, from the viewpoint of storage stability after aqueous dispersion of the block polyisocyanate compound that is to be obtained. If the molar ratio of oxyethylene groups among the oxyalkylene groups is less than about 20 mol %, the hydrophilicity imparted may be inadequate, and the storage stability after aqueous dispersion of the block polyisocyanate compound that is to be obtained may be reduced.

Also, the active hydrogen-containing compound having a nonionic hydrophilic group preferably has a number-average molecular weight in the range of about 200 to about 2,000, from the viewpoint of the storage stability after aqueous dispersion of the block polyisocyanate compound that is to be obtained, and the water resistance of the coating film that is to be formed. The number-average molecular weight is more preferably about 300 or greater and even more preferably about 400 or greater, from the viewpoint of the storage stability after aqueous dispersion of the block polyisocyanate compound that is to be obtained. The number-average molecular weight is more preferably about 1,500 or less and even more preferably about 1,200 or less, from the viewpoint of water resistance of the coating film that is to be formed by the aqueous coating composition containing the block polyisocyanate compound.

As used herein, "number-average molecular weight" and "weight-average molecular weight" are the values determined by converting the retention time (retention volume) using gel permeation chromatography (GPC) to polystyrene molecular weight based on the retention time (retention volume) for standard polystyrene of known molecular weight, measured under the same conditions.

Specifically, it may be measured using "HLC-8120GPC" (trade name of Tosoh Corp.) as the gel permeation chromatograph, using 4 columns, a "TSKgel G4000HXL", "TSKgel G3000HXL", "TSKgel G2500HXL" and "TSKgel G2000HXL" (all trade names of Tosoh Corp.) as the columns, and using a differential refractometer as the detector, under the conditions of mobile phase: tetrahydrofuran, measuring temperature: 40° C., flow rate: 1 mL/min.

Examples of active hydrogen-containing compounds having nonionic hydrophilic groups include polyethyleneglycol monoalkyl ethers (alternate name: ω-alkoxypolyoxyethylenes) such as polyethyleneglycol monomethyl ether and polyethyleneglycol monoethyl ether, polypropyleneglycol monoalkyl ethers (alternate name: ω-alkoxypolyoxypropylenes) such as polypropyleneglycol monomethyl ether and polypropyleneglycol monoethyl ether, ω-alkoxypolyoxyethylene(oxypropylene)s such as ω-methoxypolyoxyethylene (oxypropylene) and ω-ethoxypolyoxyethylene(oxypropylene), polyethylene glycol (propylene glycol)monoalkyl ethers such as polyethylene glycol (propylene glycol)monomethyl ether and polyethylene glycol (propylene glycol) monoethyl ether, and polyethylene glycol, polypropylene glycol, polyethylene glycol(propylene glycol), α-(aminoalkyl)-ω-alkoxypolyoxyethylene, α-(aminoalkyl)-ω-alkoxypolyoxypropylene, α-(aminoalkyl)-ω-alkoxypolyoxyethylene and the like, as well as any desired combinations of the foregoing.

Preferred for the active hydrogen-containing compound having a nonionic hydrophilic group are polyethyleneglycol monomethyl ether, polyethyleneglycol monoethyl ether and polyethylene glycol, with polyethyleneglycol monomethyl ether being more preferred.

As used herein, "polyethylene glycol(propylene glycol)" means a copolymer of ethylene glycol and propylene glycol, and it includes block copolymers and random copolymers.

Examples of commercial products of polyethyleneglycol monomethyl ether include "UNIOX M-400", "UNIOX M-550", "UNIOX M-1000" and "UNIOX M-2000" by NOF Corp. Also, examples of commercial products of polyethylene glycol include "PEG#200", "PEG#300", "PEG#400", "PEG#600", "PEG#1000", "PEG#1500", "PEG#1540" and "PEG#2000" by NOF Corp.

Examples of active hydrogen-containing compounds having anionic hydrophilic groups include active hydrogen-containing compounds having acidic groups, for example, active hydrogen-containing compounds having carboxyl groups, active hydrogen-containing compounds having sulfonic acid groups and active hydrogen-containing compounds having phosphate groups, as well as their neutralized salts, and any desired combinations of the foregoing. The active hydrogen-containing compound having an anionic hydrophilic group is preferably an active hydrogen-containing compound having a carboxyl group, from the viewpoint of compatibility between the block polyisocyanate compound that is to be obtained and the other coating material components.

Some or all of the acidic groups in the active hydrogen-containing compound having an anionic hydrophilic group are preferably neutralized with a basic compound, in order to minimize inhibition of the reaction of blocking the isocyanate groups in the polyisocyanate compound ($b_1$) with the active methylene compound ($b_3$) described hereunder.

The acidic groups in the active hydrogen-containing compound having an anionic hydrophilic group may be neutralized before reaction between the active hydrogen-containing compound having an anionic hydrophilic group and the polyisocyanate compound ($b_1$), or they may be neutralized after the reaction.

Examples of basic compounds include hydroxides of alkali metals or alkaline earth metals such as sodium hydroxide, potassium hydroxide, lithium hydroxide, calcium hydroxide and barium hydroxide; metal alkoxides; ammonia; primary monoamines such as ethylamine, propylamine, butylamine, benzylamine, monoethanolamine, 2,2-dimethyl-3-amino-1-propanol, 2-aminopropanol, 2-amino-2-methyl-1-propanol and 3-aminopropanol; secondary monoamines such as diethylamine, diethanolamine, di-n-propanolamine, di-isopropanolamine, N-methylethanolamine and N-ethylethanolamine; tertiary monoamines such as dimethylethanolamine, trimethylamine, triethylamine, triisopropylamine, methyldiethanolamine and 2-(dimethylamino)ethanol; and polyamines such as diethylenetriamine, hydroxyethylaminoethylamine, ethylaminoethylamine and methylaminopropylamine, as well as any desired combinations of the foregoing. The amount of the basic compound will usually be in the range of about 0.1 to about 1.5 equivalents and preferably about 0.2 to about 1.2 equivalents with respect to the anionic groups in the active hydrogen-containing compound having the anionic hydrophilic group.

Examples of active hydrogen-containing compounds having carboxyl groups include monohydroxycarboxylic acids such as glycolic acid, lactic acid, hydroxypivalic acid, malic acid and citric acid, dihydroxycarboxylic acids such as 2,2-dimethylolacetic acid, 2,2-dimethylollactic acid, 2,2-dimethylolpropionic acid, 2,2-dimethylolbutanoic acid, dimethylolheptanoic acid, dimethylolnonanoic acid, 2,2-dimethylolbutyric acid and 2,2-dimethylolvaleric acid, lactone ring-opening addition products of these dihydroxycarboxylic acids, glycine, 1-carboxy-1,5-pentylenediamine, dihydroxybenzoic acid, 3,5-diaminobenzoic acid, lysine, arginine, and the like.

Examples of active hydrogen-containing compounds having sulfonic acid groups include 2-amino-1-ethanesulfonic acid, N,N-bis(2-hydroxyethyl)-2-aminoethanesulfonic acid, 1,3-phenylenediamine-4,6-disulfonic acid, diaminobutanesulfonic acid, 3,6-diamino-2-toluenesulfonic acid, 2,4-diamino-5-toluenesulfonic acid, 2-(cyclohexylamino)-ethanesulfonic acid and 3-(cyclohexylamino)-propanesulfonic acid.

Examples of active hydrogen-containing compounds having phosphate groups include 2,3-dihydroxypropylphenyl phosphate, hydroxyalkylphosphonic acids and aminoalkylphosphonic acids.

When some of the isocyanate groups of the polyisocyanate compound ($b_1$) are to be reacted with the active hydrogen-containing compound having a hydrophilic group (b2), the proportion of the polyisocyanate compound ($b_1$) and the active hydrogen-containing compound having a hydrophilic group (b2) is preferably in the range of about 0.03 to about 0.6 mol as the number of moles of active hydrogens in the active hydrogen-containing compound having a hydrophilic group (b2) based on 1 mol of isocyanate groups in the polyisocyanate compound ($b_1$), from the viewpoint of storage stability after aqueous dispersion and the curability of the block polyisocyanate compound that is to be obtained, and the adhesion, smoothness, sharpness and water resistance of the coating film that is to be formed by the aqueous coating composition containing the block polyisocyanate compound.

The proportion is more preferably about 0.4 or less and even more preferably about 0.3 or less, from the viewpoint of the curability of the block polyisocyanate compound that is to be obtained and the water resistance of the coating film that is to be formed by the aqueous coating composition containing the block polyisocyanate compound. The proportion is also more preferably about 0.04 or greater and even more preferably about 0.05 or greater, from the viewpoint of the storage stability after aqueous dispersion of the block polyisocyanate compound that is to be obtained and the adhesion, smoothness, sharpness and water resistance of the coating film that is to be formed by the aqueous coating composition containing the block polyisocyanate compound.

[Active Methylene Compound ($b_3$)]

Examples for the active methylene compound ($b_3$) that blocks the isocyanate groups in the polyisocyanate compound ($b_1$) include malonic acid diesters such as dimethyl malonate, diethyl malonate, di-n-propyl malonate, diisopropyl malonate, di-n-butyl malonate, diisobutyl malonate, di-sec-butyl malonate, di-tert-butyl malonate, di-n-pentyl malonate, di-n-hexyl malonate, di(2-ethylhexyl) malonate, methyl-isopropyl malonate, ethyl-isopropyl malonate, methyl-n-butyl malonate, ethyl-n-butyl malonate, methyl-isobutyl malonate, ethyl-isobutyl malonate, methyl-sec-butyl malonate, ethyl-sec-butyl malonate, diphenyl malonate and dibenzyl malonate, acetoacetic acid esters such as methyl acetoacetate, ethyl acetoacetate, n-propyl acetoacetate, isopropyl acetoacetate, n-butyl acetoacetate, isobutyl acetoacetate, sec-butyl acetoacetate, tert-butyl acetoacetate, n-pentyl acetoacetate, n-hexyl acetoacetate, 2-ethylhexyl acetoacetate, phenyl acetoacetate and benzyl acetoacetate, isobutyryl acetic acid esters such as methyl isobutyrylacetate, ethyl isobutyrylacetate, n-propyl isobutyrylacetate, isopropyl isobutyrylacetate, n-butyl isobutyrylacetate, isobutyl isobutyrylacetate, sec-butyl isobutyrylacetate, tert-butyl isobutyrylacetate, n-pentyl isobutyrylacetate, n-hexyl isobutyrylacetate, 2-ethylhexyl isobutyrylacetate, phenyl isobutyrylacetate and benzyl isobutyrylacetate, and any desired combinations of the foregoing.

The active methylene compound ($b_3$) is preferably at least one compound selected from the group consisting of dimethyl malonate, diethyl malonate, diisopropyl malonate, methyl acetoacetate, ethyl acetoacetate, isobutyrylmethyl acetate and isobutyrylethyl acetate, and more preferably at least one compound selected from the group consisting of diisopropyl malonate, methyl isobutyrylacetate and ethyl isobutyrylacetate, from the viewpoint of smoothness and sharpness of the coating film that is to be formed by the aqueous coating composition containing the block polyisocyanate compound to be obtained.

The active methylene compound ($b_3$) is even more preferably diisopropyl malonate, from the viewpoint of the reactivity and storage stability of the block polyisocyanate compound that is to be obtained and the smoothness and sharpness of the coating film that is to be formed by the aqueous coating composition containing the block polyisocyanate compound.

The blocking reaction of isocyanate groups by the active methylene compound ($b_3$) may include a reaction catalyst if desired. Examples for the reaction catalyst include basic compounds such as metal hydroxides, metal alkoxides, metal carboxylates, metal acetylacetonates, onium salt hydroxides, onium carboxylates, metal salts of active methylene compounds, onium salts of active methylene compounds, aminosilanes, amines, phosphines, and the like. Preferred as onium salts are ammonium salts, phosphonium salts and sulfonium salts.

The amount of reaction catalyst is usually preferred to be in the range of about 10 to about 10,000 ppm and more preferably in the range of about 20 to about 5,000 ppm, based on the total solid mass of the polyisocyanate compound ($b_1$) and the active methylene compound ($b_3$)

The blocking reaction of isocyanate groups by the active methylene compound ($b_3$) may be conducted at between about 0 and about 150° C., and a solvent may be included. The solvent is preferably an aprotic solvent, with solvents such as esters, ethers, N-alkylamides and ketones being especially preferred. As the reaction progresses, an acid component may be added to the reaction system to neutralize the basic compound catalyst, thereby suspending the blocking reaction.

There are no particular restrictions on the amount of the active methylene compound ($b_3$) in the blocking reaction of the isocyanate groups by the active methylene compound ($b_3$), but preferably it is about 0.1 to about 3 mol and more preferably about 0.2 to about 2 mol, with respect to 1 mol of isocyanate groups in the polyisocyanate compound ($b_1$). Also, the active methylene compounds that have not reacted with isocyanate groups in the polyisocyanate compound ($b_1$) may be removed after completion of the blocking reaction.

Also, in the blocking reaction of the isocyanate groups by the active methylene compound ($b_3$), there may be added an alcohol-based, phenol-based, oxime-based, amine-based, acid amide-based, imidazole-based, pyridine-based or mercaptane-based blocking agent in addition to the active methylene compound ($b_3$).

Thus, according to one embodiment of the block polyisocyanate compound of the invention, some of the isocyanate groups of the block polyisocyanate compound are blocked by a blocking agent other than the active methylene compound ($b_3$).

[Block Polyisocyanate Compound Precursor ($b_4$) Having Hydrophilic Group]

The block polyisocyanate compound precursor having a hydrophilic group (b4) can be obtained by reacting a polyisocyanate compound ($b_1$) having two or more isocyanate groups in the molecule, an active hydrogen-containing compound having a hydrophilic group (b2), and an active methylene compound ($b_3$). The block polyisocyanate compound precursor having a hydrophilic group (b4) will usually be a block polyisocyanate compound wherein some of the isocyanate groups in the polyisocyanate compound ($b_1$) react with the active hydrogen-containing compound having a hydrophilic group (b2), while some or all of the remaining isocyanate groups are blocked by the active methylene compound ($b_3$).

As used herein, a block polyisocyanate compound precursor having a hydrophilic group (b4) means a "precursor" which is a substance at a stage prior to production of the block polyisocyanate compound of the invention, and the block polyisocyanate compound precursor having a hydrophilic group (b4) is also a block polyisocyanate compound in which the isocyanate groups are blocked.

The block polyisocyanate compound precursor having a hydrophilic group (b4) is preferably either or both a compound selected from the group consisting of block polyisocyanate compound precursors having hydrophilic groups ($b_{41}$), having a block isocyanate group represented by the following formula (IV):

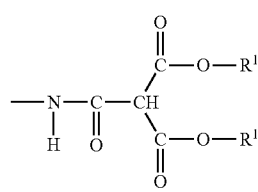

(IV)

wherein each $R^1$ independently represents a C1-12 hydrocarbon group, and may be the same or different, and block polyisocyanate compound precursors having hydrophilic groups ($b_{42}$), having a block isocyanate group represented by the following formula (V):

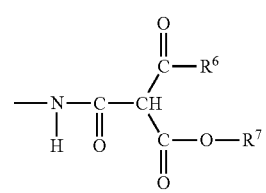

(V)

wherein $R^6$ and $R^7$ each independently represent an approximately C1-12 hydrocarbon group.

[Block Polyisocyanate Compound Precursor Having Hydrophilic Group ($b_{41}$)]

The block polyisocyanate compound precursor having a hydrophilic group (b41) is preferably one wherein $R^1$ is an approximately C1-3 alkyl group, from the viewpoint of allowing use of an active methylene compound that can be produced or obtained relatively easily as the active methylene compound ($b_3$), which is one of the starting materials for the block polyisocyanate compound.

From the viewpoint of improving compatibility between the block polyisocyanate compound that is to be obtained and the other coating material components, $R^1$ is more preferably a C2 or C3 alkyl group, and from the viewpoint of storage stability of the block polyisocyanate compound that is to be obtained, and the smoothness and sharpness of the coating film that is to be formed by the aqueous coating composition containing the block polyisocyanate compound, $R^1$ is more preferably an isopropyl group.

The block polyisocyanate compound precursor having a hydrophilic group (b41) may be obtained, for example, by reacting a polyisocyanate compound ($b_1$), an active hydrogen-containing compound having a hydrophilic group (b2), and a dialkyl malonate having an approximately C1-12 alkyl group as an active methylene compound ($b_3$).

Examples of dialkyl malonates include dimethyl malonate, diethyl malonate, di-n-propyl malonate, diisopropyl malonate, di-n-butyl malonate, di-isobutyl malonate, di-sec-butyl malonate, di-tert-butyl malonate, di-n-pentyl malonate, di-n-hexyl malonate and di(2-ethylhexyl) malonate, as well as any desired combinations of the foregoing. The dialkyl malonate is preferably dimethyl malonate, diethyl malonate, di-n-propyl malonate, di-isopropyl malonate, di-n-butyl malonate, di-isobutyl malonate, di-sec-butyl malonate or di-tert-butyl malonate, more preferably diethyl malonate, di-n-propyl malonate or di-isopropyl malonate, and even more preferably di-isopropyl malonate.

[Block Polyisocyanate Compound Precursor Having Hydrophilic Group ($b_{42}$)]

The block polyisocyanate compound precursor having a hydrophilic group (b42) is preferably one wherein $R^6$ and $R^7$ are approximately C1-C3 alkyl groups, from the viewpoint of allowing use of an active methylene compound that can be produced or obtained relatively easily as the active methylene compound ($b_3$), which is one of the starting materials for the block polyisocyanate compound.

From the viewpoint of improving compatibility between the block polyisocyanate compound that is to be obtained and the other coating material components, $R^6$ and $R^7$ are more preferably C2 or C3 alkyl groups, and from the viewpoint of storage stability of the block polyisocyanate compound that is to be obtained, and the smoothness and sharpness of the coating film that is to be formed by the aqueous coating composition containing the block polyisocyanate compound, $R^6$ and $R^7$ are more preferably isopropyl groups.

The block polyisocyanate compound precursor having a hydrophilic group (b42) may be obtained, for example, by reacting a polyisocyanate compound ($b_1$), an active hydrogen-containing compound having a hydrophilic group (b2), and an acetoacetic acid ester having an approximately C1-C12 hydrocarbon group or an isobutyrylacetic acid ester having an approximately C1-C12 hydrocarbon group, as an active methylene compound ($b_3$). The active methylene compound ($b_3$) is preferably an isobutyrylacetic acid ester having an approximately C1-C12 hydrocarbon group.

Examples of isobutyrylacetic acid esters having approximately C1-C12 hydrocarbon groups include approximately C1-C12 alkyl esters of isobutyrylacetic acid, such as methyl isobutyrylacetate, ethyl isobutyrylacetate, n-propyl isobutyrylacetate, isopropyl isobutyrylacetate, n-butyl isobutyrylacetate, isobutyl isobutyrylacetate, sec-butyl isobutyrylacetate, tert-butyl isobutyrylacetate, n-pentyl isobutyrylacetate, n-hexyl isobutyrylacetate, 2-ethylhexyl isobutyrylacetate, phenyl isobutyrylacetate and benzyl isobutyrylacetate, as well as any desired combinations of the foregoing, with methyl isobutyrylacetate, ethyl isobutyrylacetate and isopropyl isobutyrylacetate being preferred.

Also, examples of acetoacetic acid esters having approximately C1-C12 hydrocarbon groups include approximately C1-C12 alkyl esters of acetoacetic acid such as methyl acetoacetate, ethyl acetoacetate, n-propyl acetoacetate, isopropyl acetoacetate, n-butyl acetoacetate, isobutyl acetoacetate, sec-butyl acetoacetate, tert-butyl acetoacetate, n-pentyl acetoacetate, n-hexyl acetoacetate, 2-ethylhexyl acetoacetate, phenyl acetoacetate and benzyl acetoacetate, as well as any desired combinations of the foregoing, with methyl acetoacetate, ethyl acetoacetate and isopropyl acetoacetate being preferred.

[Secondary Alcohol ($b_5$)]

The block polyisocyanate compound of the invention can be produced, for example, by reacting a block polyisocyanate compound precursor having a hydrophilic group ($b_4$) with a secondary alcohol, where the secondary alcohol is not particularly restricted but is preferably a secondary alcohol ($b_5$) represented by the following formula (VI):

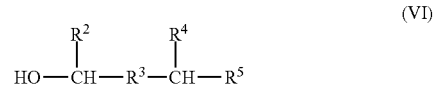

(VI)

wherein $R^2$, $R^4$ and $R^5$ each independently represent an approximately C1-C12 hydrocarbon group, and $R^3$ represents an approximately C1-C12 straight or branched alkylene group.

In the secondary alcohol ($b_5$), $R^2$ is preferably a methyl group from the viewpoint of increasing reactivity with the block polyisocyanate compound precursor having a hydrophilic group ($b_4$). Also, if $R^3$, $R^4$ and $R^5$ each have high carbon numbers the polarity of the obtained block polyisocyanate compound may be reduced and compatibility with the other coating material components may be lowered, and therefore $R^3$ is preferably an approximately C1-C3 alkylene group, and $R^4$ and $R^5$ are preferably methyl groups.

Examples for the secondary alcohol ($b_5$) include 4-methyl-2-pentanol, 5-methyl-2-hexanol, 6-methyl-2-heptanol and 7-methyl-2-octanol, as well as any desired combinations of the foregoing. The secondary alcohol ($b_5$) is preferably 4-methyl-2-pentanol which has a relatively low boiling point, since this will help facilitate its removal when some or all of the unreacted secondary alcohol ($b_5$) is distilled off following reaction between the block polyisocyanate compound precursor having a hydrophilic group (b4) and the secondary alcohol ($b_5$).

The block polyisocyanate compound can be produced by reacting a block polyisocyanate compound precursor having a hydrophilic group (b41), having a block isocyanate group represented by the following formula (IV):

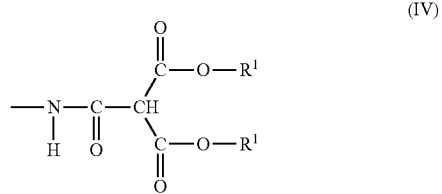

(IV)

wherein each $R^1$ independently represents an approximately C1-C12 hydrocarbon group and may be the same or different, with a secondary alcohol ($b_5$).

In this reaction, at least one of the $R^1$ groups in the block isocyanate group in the block polyisocyanate compound precursor having a hydrophilic group (b41) is replaced with a group represented by the following formula (VII):

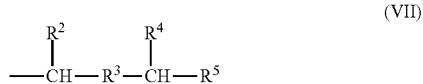

wherein $R^2$, $R^4$ and $R^5$ each independently represent an approximately C1-C12 hydrocarbon group, and $R^3$ represents an approximately C1-C12 straight or branched alkylene group.

In the reaction, the obtained block polyisocyanate compound has a block isocyanate group represented by the following formula (I):

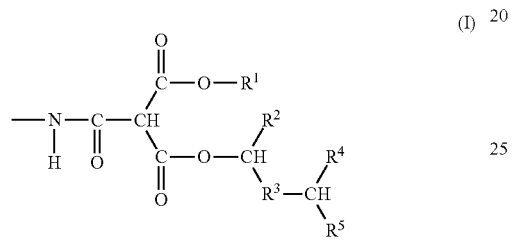

wherein $R^1$, $R^2$, $R^4$ and $R^5$ each independently represent an approximately C1-C12 hydrocarbon group and $R^3$ represents an approximately C1-C12 straight or branched alkylene group, or a block isocyanate group represented by the following formula (II):

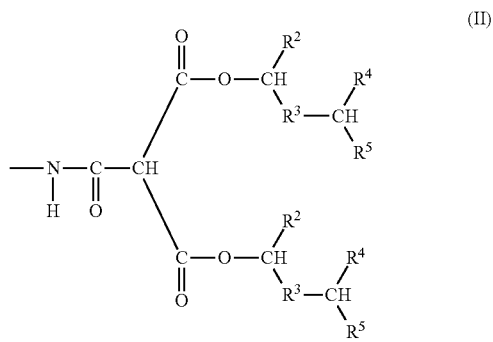

wherein $R^2$, $R^3$, $R^4$ and $R^5$ are as defined above.

The reaction between the block polyisocyanate compound precursor having a hydrophilic group (b41) and the secondary alcohol ($b_5$) is not particularly restricted so long as it is a production method that, for example, allows at least one of the $R^1$ groups of the block isocyanate group in the block polyisocyanate compound precursor having a hydrophilic group (b41) to be replaced by a group represented by formula (VII). For the production method, preferably some or all of the alcohols derived from at least one $R^1$ group in the block polyisocyanate compound precursor having a hydrophilic group (b41) are distilled out of the system by heating and pressure reduction or the like, and reaction is promoted to obtain a block polyisocyanate compound having a block isocyanate group represented by formula (I) or (II) and a hydrophilic group.

The production method, specifically, is conducted at a temperature of preferably about 20 to 150° C. and more preferably about 75 to 95° C., optionally with pressure reduction, preferably for between about 5 minutes and about 20 hours, and more preferably between about 10 minutes and about 10 hours, to remove some or all of the alcohols. If the temperature is too low, the substitution reaction of alkoxy groups in the block polyisocyanate compound precursor having a hydrophilic group (b41) will be delayed and the production efficiency may be reduced, while if the temperature is too high, decomposing degradation of the obtained block polyisocyanate compound will become more severe and the curability may be lowered.

In addition, the block polyisocyanate compound can be produced by reacting a block polyisocyanate compound precursor having a hydrophilic group (b42), having a block isocyanate group represented by the following formula (V):

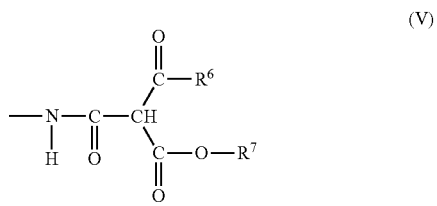

wherein $R^6$ and $R^7$ each independently represent an approximately C1-C12 hydrocarbon group, with a secondary alcohol ($b_5$).

In this reaction, $R^7$ in the block isocyanate group in the block polyisocyanate compound having a hydrophilic group ($b_{42}$) is replaced with a group represented by the following formula (VII):

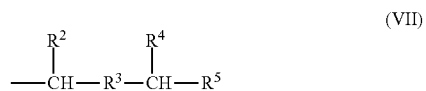

wherein $R^2$, $R^4$ and $R^5$ each independently represent an approximately C1-C12 hydrocarbon group, and $R^3$ represents an approximately C1-C12 straight or branched alkylene group.

In the reaction, the obtained block polyisocyanate compound has a block isocyanate group represented by the following formula (III):

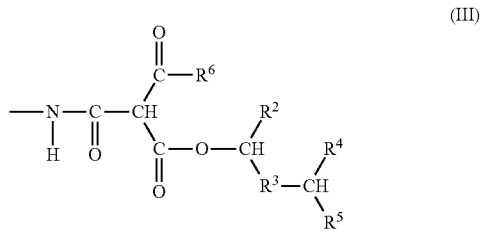

wherein $R^2$, $R^3$, $R^4$ and $R^5$ are as defined above, and $R^6$ represents an approximately C1-C12 hydrocarbon group.

The reaction between the block polyisocyanate compound precursor having a hydrophilic group (b42) and the secondary alcohol ($b_5$) is not particularly restricted so long as it is a production method that, for example, allows $R^7$ of the block isocyanate group in the block polyisocyanate compound precursor having a hydrophilic group (b42) to be replaced by a group represented by formula (VII). In the production method, preferably some or all of the alcohols derived from $R^7$ in the block polyisocyanate compound precursor having a hydrophilic group (b42) are distilled out of the system by heating and pressure reduction or the like, and reaction is promoted to obtain a block polyisocyanate compound having a block isocyanate group represented by formula (III) and a hydrophilic group.

The production method, specifically, is conducted at a temperature of preferably about 20 to 150° C. and more preferably about 75 to 95° C., optionally with pressure reduction, preferably for between about 5 minutes and about 20 hours, and more preferably between about 10 minutes and about 10 hours, to remove some or all of the alcohols. If the temperature is too low, the substitution reaction of alkoxy groups in the block polyisocyanate compound precursor having a hydrophilic group (b42) will be delayed and the production efficiency may be reduced, while if the temperature is too high, decomposing degradation of the obtained block polyisocyanate compound will become more severe and the curability may be lowered.

Also, the amounts of the block polyisocyanate compound precursor having a hydrophilic group (b4) and the secondary alcohol ($b_5$) for production of the block polyisocyanate compound, from the viewpoint of reactivity of the block polyisocyanate compound that is to be obtained and production efficiency, are such that the secondary alcohol ($b_5$) is preferably in the range of about 5 to about 500 parts by mass and more preferably in the range of about 10 to about 200 parts by mass with respect to 100 parts by solid mass of the block polyisocyanate compound precursor having a hydrophilic group (b4). If the amount of the secondary alcohol ($b_5$) is less than about 5 parts by mass, the reaction rate between the block polyisocyanate compound precursor having a hydrophilic group (b4) and the secondary alcohol ($b_5$) may be too slow. Also, if the amount of the secondary alcohol ($b_5$) is greater than about 500 parts by mass, the concentration of the produced block polyisocyanate compound may be too low, lowering the production efficiency.

Also, during reaction between the block polyisocyanate compound precursor having a hydrophilic group (b4) and the secondary alcohol ($b_5$), the aforementioned removal procedure may be carried out after adding a polyol compound to the block polyisocyanate compound precursor having a hydrophilic group (b4) and the secondary alcohol ($b_5$), in order to modify the molecular weight of the block polyisocyanate compound.

The number-average molecular weight of the block polyisocyanate compound of the invention is preferably in the range of about 600 to about 30,000, from the viewpoint of compatibility with the other coating material components, and the smoothness, sharpness, adhesion, water resistance and chipping resistance of the coating film that is to be formed by the aqueous coating composition containing the block polyisocyanate compound.

The number-average molecular weight is more preferably about 10,000 or less and even more preferably about 5,000 or less, from the viewpoint of compatibility with the other coating material components and smoothness and sharpness of the coating film that is to be formed by the aqueous coating composition containing the block polyisocyanate compound. The number-average molecular weight is more preferably about 900 or greater and even more preferably about 1,000 or greater, from the viewpoint of the adhesion, water resistance and chipping resistance of the coating film that is to be formed by the aqueous coating composition containing the block polyisocyanate compound.

The block polyisocyanate compound may also be added as a mixture with a surfactant, for production of the aqueous coating composition. The surfactant is preferably a nonionic surfactant and/or anionic surfactant, from the viewpoint of stability of the aqueous coating composition that will contain the block polyisocyanate compound.

The reason for the excellent storage stability in water of the block polyisocyanate compound of the invention is conjectured to be that it exists relatively stably in water because of its hydrophilic groups, and that the block isocyanate groups have lower low polarity because of the hydrocarbon groups having a branched structure, and it is therefore resistant to hydrolysis.

[Aqueous Coating Composition]

The block polyisocyanate compound may also be included, for example, as a curing agent in the aqueous coating composition. Specifically, the aqueous coating composition may be an aqueous coating composition containing, for example, the hydroxyl-containing resin (A) mentioned below, and the aforementioned block polyisocyanate compound (hereunder also referred to as "block polyisocyanate compound (B)"). The aqueous coating composition has the advantage of being able to form a coating film with excellent adhesion even when it is coated after storage. The aqueous coating composition also has satisfactory storage stability and therefore has the advantage of being able to form a coating film with excellent smoothness and sharpness.

[Hydroxyl-Containing Resin (A)]

Examples for the hydroxyl-containing resin (A) include a hydroxyl-containing acrylic resin ($A_1$), a hydroxyl-containing polyester resin ($A_2$), a hydroxyl-containing polyurethane resin ($A_3$), a hydroxyl-containing epoxy resin and a hydroxyl-containing alkyd resin, as well as any desired combinations of the foregoing.

The hydroxyl-containing resin (A) has a hydroxyl value in the range of preferably about 1 to about 200 mgKOH/g, more preferably about 2 to about 180 mgKOH/g and even more preferably about 5 to about 170 mgKOH/g.

In an embodiment in which the hydroxyl-containing resin (A) has acidic groups such as carboxyl groups, the hydroxyl-containing resin (A) has an acid value in the range of preferably about 0.1 to about 150 mgKOH/g, more preferably about 0.5 to about 100 mgKOH/g and even more preferably about 1 to about 40 mgKOH/g.

From the viewpoint of smoothness, sharpness and water resistance of the coating film that is to be formed, the hydroxyl-containing resin (A) is preferably either or both from among the group consisting of hydroxyl-containing acrylic resins ($A_1$) and/or hydroxyl-containing polyester resins ($A_2$), and more preferably it includes both a hydroxyl-containing acrylic resin ($A_1$) and a hydroxyl-containing polyester resin ($A_2$).

In an embodiment in which the aqueous coating composition includes both a hydroxyl-containing acrylic resin ($A_1$) and a hydroxyl-containing polyester resin ($A_2$) as the hydroxyl-containing resin (A), the hydroxyl-containing acrylic resin ($A_1$) and the hydroxyl-containing polyester resin ($A_2$) are present in ranges of preferably about 10 to about 90 mass % and about 10 to about 90 mass %, and more preferably in ranges of about 20 to about 80 mass % and about 20 to about 80 mass %, based on the total solid mass.

[Hydroxyl-Containing Acrylic Resin ($A_1$)]

The hydroxyl-containing acrylic resin ($A_1$) can be produced, for example, by copolymerizing a hydroxyl-containing polymerizable unsaturated monomer ($a_1$) and another polymerizable unsaturated monomer ($a_2$) that is copolymerizable with the hydroxyl-containing polymerizable unsaturated monomer ($a_1$), by a known method, for example, a solution polymerization method in an organic solvent, an emulsion polymerization method in water or a miniemulsion polymerization method in water.

The hydroxyl-containing polymerizable unsaturated monomer ($a_1$) is a compound having one or more hydroxyl and polymerizable unsaturated bonds in the molecule. Examples for the hydroxyl-containing polymerizable unsaturated monomer ($a_1$) include monoesterified products of (meth)acrylic acid and approximately C2-C8 dihydric alcohols, such as 2-hydroxyethyl (meth)acrylate, 2-hydroxypropyl (meth)acrylate, 3-hydroxypropyl (meth)acrylate and 4-hydroxybutyl (meth)acrylate; ε-caprolactone-modified forms of monoesterified products of the (meth)acrylic acid and approximately C2-C8 dihydric alcohols; N-hydroxymethyl (meth)acrylamide; allyl alcohols, and (meth)acrylates having polyoxyethylene chains with hydroxyl group molecular ends, as well as any desired combinations of the foregoing.

Examples for the other polymerizable unsaturated monomer ($a_2$) that is copolymerizable with the hydroxyl-containing polymerizable unsaturated monomer ($a_1$) include the following monomers (i) to (xix), as well as any desired combinations of the foregoing.

(i) Alkyl or Cycloalkyl (Meth)Acrylates:

For example, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-hexyl (meth)acrylate, n-octyl (meth)acrylate, 2-ethylhexyl (meth)acrylate, nonyl (meth)acrylate, tridecyl (meth)acrylate, lauryl (meth)acrylate, stearyl (meth)acrylate, isostearyl (meth)acrylate, cyclohexyl (meth)acrylate, methylcyclohexyl (meth)acrylate, tert-butylcyclohexyl (meth)acrylate, cyclododecyl (meth)acrylate, tricyclodecanyl (meth)acrylate and the like.

(ii) Polymerizable Unsaturated Monomers with Isobornyl Groups:

Isobornyl (meth)acrylate and the like.

(iii) Polymerizable Unsaturated Monomers with Adamantyl Groups:

Adamantyl (meth)acrylate and the like.

(iv) Polymerizable Unsaturated Monomers with Tricyclodecenyl Groups:

Tricyclodecenyl (meth)acrylate and the like.

(v) Aromatic Ring-Containing Polymerizable Unsaturated Monomers:

Benzyl (meth)acrylate, styrene, α-methylstyrene, vinyltoluene and the like.

(vi) Polymerizable Unsaturated Monomers with Alkoxysilyl Groups:

Vinyltrimethoxysilane, vinyltriethoxysilane, vinyltris(2-methoxyethoxy)silane, γ-(meth)acryloyloxypropyltrimethoxysilane, γ-(meth)acryloyloxypropyltriethoxysilane and the like.

(vii) Polymerizable Unsaturated Monomers with Fluorinated Alkyl Groups:

Perfluoroalkyl (meth)acrylates such as perfluorobutylethyl (meth)acrylate and perfluorooctylethyl (meth)acrylate, and fluoroolefins and the like.

(viii) Polymerizable Unsaturated Monomers with Photopolymerizable Functional Groups Such as Maleimide.

(ix) Vinyl Compounds:

N-vinylpyrrolidone, ethylene, butadiene, chloroprene, vinyl propionate, vinyl acetate and the like.

(x) Carboxyl Group-Containing Polymerizable Unsaturated Monomers:

(Meth)acrylic acid, maleic acid, crotonic acid, β-carboxyethyl acrylate and the like.

(xi) Nitrogen-Containing Polymerizable Unsaturated Monomers:

(Meth)acrylonitrile, (meth)acrylamide, N,N-dimethylaminoethyl (meth)acrylate, N,N-diethylaminoethyl (meth)acrylate, N,N-dimethylaminopropyl (meth)acrylamide, methylenebis(meth)acrylamide, ethylenebis(meth)acrylamide, glycidyl (meth)acrylate, amine compound addition products, and the like.

(xii) Polymerizable Unsaturated Monomers with Two or More Polymerizable Unsaturated Groups in the Molecule:

Allyl (meth)acrylates, 1,6-hexanediol di(meth)acrylate and the like.

(xiii) Epoxy Group-Containing Polymerizable Unsaturated Monomers:

Glycidyl (meth)acrylate, β-methylglycidyl (meth)acrylate, 3,4-epoxycyclohexylmethyl (meth)acrylate, 3,4-epoxycyclohexylethyl (meth)acrylate, 3,4-epoxycyclohexylpropyl (meth)acrylate, allyl glycidyl ether and the like.

(xiv) (Meth)Acrylates with Polyoxyethylenes Chains with Alkoxy Groups at the Molecular Ends (xv) Polymerizable Unsaturated Monomers with Sulfonic Acid Groups:

2-Acrylamide-2-methylpropanesulfonic acid, 2-sulfoethyl (meth)acrylate, allylsulfonic acid, 4-styrenesulfonic acid and the like; and sodium salts and ammonium salts of these sulfonic acids.

(xvi) Polymerizable Unsaturated Monomers with Phosphate Groups:

Acid phosphooxyethyl (meth)acrylate, acid phosphooxypropyl (meth)acrylate, acid phosphooxypoly(oxyethylene) glycol (meth)acrylate, acid phosphooxypoly(oxypropylene) glycol (meth)acrylates and the like.

(xvii) Polymerizable Unsaturated Monomers with Ultraviolet Absorbing Functional Groups:

2-Hydroxy-4-(3-methacryloyloxy-2-hydroxypropoxy) benzophenone, 2-hydroxy-4-(3-acryloyloxy-2-hydroxypropoxy)benzophenone, 2,2'-dihydroxy-4-(3-methacryloyloxy-2-hydroxypropoxy)benzophenone, 2,2'-dihydroxy-4-(3-acryloyloxy-2-hydroxypropoxy)benzophenone, 2-(2'-hydroxy-5'-methacryloyloxyethylphenyl)-2H-benzotriazole and the like.

(xviii) Ultraviolet-Stable Polymerizable Unsaturated Monomers:

4-(Meth)acryloyloxy-1,2,2,6,6-pentamethylpiperidine, 4-(meth)acryloyloxy-2,2,6,6-tetramethylpiperidine, 4-cyano-4-(meth)acryloylamino-2,2,6,6-tetramethylpiperidine, 1-(meth)acryloyl-4-(meth)acryloylamino-2,2,6,6-tetramethylpiperidine, 1-(meth)acryloyl-4-cyano-4-(meth) acryloylamino-2,2,6,6-tetramethylpiperidine, 4-crotonoyloxy-2,2,6,6-tetramethylpiperidine, 4-crotonoylamino-2,2,6,6-tetramethylpiperidine, 1-crotonoyl-4-crotonoyloxy-2,2,6,6-tetramethylpiperidine and the like.

(xix) Polymerizable Unsaturated Monomers with Carbonyl Groups:

Acrolein, diacetoneacrylamide, diacetonemethacrylamide, acetoacetoxyethyl methacrylate, formylstyrol, approximately C4-C7 vinyl alkyl ketones (for example, vinyl methyl ketone, vinyl ethyl ketone and vinyl butyl ketone), and the like.

As used herein, "polymerizable unsaturated group" means an unsaturated group that can participate in radical polymerization. Examples of such polymerizable unsaturated groups include vinyl and (meth)acryloyl.

Also, as used herein, "(meth)acrylate" refers to acrylate and/or methacrylate. The term "(meth)acrylic acid" refers to acrylic acid and/or methacrylic acid. The term "(meth)acryloyl" refers to acryloyl and/or methacryloyl. The term "(meth)acrylamide" refers to acrylamide and/or methacrylamide.

The proportion of the hydroxyl-containing polymerizable unsaturated monomer ($a_1$) during production of the hydroxyl-containing acrylic resin ($A_1$) is preferably about 0.5 to about 50 mass %, more preferably about 1.0 to about 40 mass % and even more preferably about 1.5 to about 30 mass %, based on the total amount of the monomer components.

From the viewpoint of the water resistance of the coating film that is to be formed, the hydroxyl-containing acrylic resin ($A_1$) has a hydroxyl value of preferably about 1 to about 200 mgKOH/g, more preferably about 2 to about 180 mgKOH/g and even more preferably about 5 to about 170 mgKOH/g.

For an embodiment in which the hydroxyl-containing acrylic resin ($A_1$) has an acid value, the hydroxyl-containing acrylic resin ($A_1$) has an acid value of preferably about 100 mgKOH/g or less, more preferably about 0.5 to about 60 mgKOH/g and even more preferably about 1 to about 40 mgKOH/g, from the viewpoint of storage stability of the coating material and the sharpness and water resistance of the coating film that is to be formed.

For an embodiment in which the aqueous coating composition contains a hydroxyl-containing acrylic resin ($A_1$) as the hydroxyl-containing resin (A), the aqueous coating composition contains the hydroxyl-containing acrylic resin ($A_1$) in the range of preferably about 2 to about 95 mass %, more preferably about 10 to about 75 mass % and even more preferably about 15 to about 60 mass %, based on the total solid content of the hydroxyl-containing resin (A) and the block polyisocyanate compound (B).

Also, the hydroxyl-containing acrylic resin ($A_1$) preferably contains a water-dispersible hydroxyl-containing acrylic resin ($A_{11}$), from the viewpoint of increasing the adhesion, smoothness, sharpness and water resistance of the coating film that is to be formed.

The water-dispersible hydroxyl-containing acrylic resin ($A_{11}$) can be produced, for example, by copolymerizing a hydroxyl-containing polymerizable unsaturated monomer ($a_1$) and another polymerizable unsaturated monomer ($a_2$) by a known method, for example, an emulsion polymerization method in water or a miniemulsion polymerization method in water.

From the viewpoint of the chipping resistance and water resistance of the coating film that is to be formed, the water-dispersible hydroxyl-containing acrylic resin ($A_{11}$) has a hydroxyl value of preferably about 1 to about 200 mgKOH/g, more preferably about 3 to about 150 mgKOH/g and even more preferably about 5 to about 100 mgKOH/g.

For an embodiment in which the water-dispersible hydroxyl-containing acrylic resin ($A_{11}$) has an acid value, the water-dispersible hydroxyl-containing acrylic resin ($A_{11}$) has an acid value of preferably about 50 mgKOH/g or less, more preferably about 0.1 to about 30 mgKOH/g and even more preferably about 1 to about 20 mgKOH/g, from the viewpoint of improving the storage stability of the coating material and the adhesion, smoothness, sharpness and water resistance of the coating film that is to be formed.

For an embodiment in which the aqueous coating composition contains a water-dispersible hydroxyl-containing acrylic resin ($A_{11}$) as the hydroxyl-containing resin (A), the aqueous coating composition contains the water-dispersible hydroxyl-containing acrylic resin ($A_{11}$) in the range of preferably about 2 to about 95 mass %, more preferably about 10 to about 75 mass % and even more preferably about 15 to about 60 mass %, based on the total solid content of the hydroxyl-containing resin (A) and the block polyisocyanate compound (B).

Also, from the viewpoint of smoothness and sharpness of the coating film that is to be formed, the water-dispersible hydroxyl-containing acrylic resin ($A_{11}$) is preferably a core-shell type.

As such a core-shell type water-dispersible hydroxyl-containing acrylic resin there is preferred a core-shell type water-dispersible hydroxyl-containing acrylic resin ($A_{111}$) comprising a copolymer (I) as the core section (hereunder also referred to as "core section copolymer (I)") whose copolymerizing components are a polymerizable unsaturated monomer ($I_1$) having two or more polymerizable unsaturated groups in the molecule (hereunder also referred to as "monomer ($I_1$)") and a polymerizable unsaturated monomer ($I_2$) having one polymerizable unsaturated group in the molecule (hereunder also referred to as "monomer ($I_2$)"), and a copolymer (II) as the shell section (hereunder also referred to as shell section copolymer (II)") whose copolymerizing components are a hydroxyl-containing polymerizable unsaturated monomer ($II_1$), a carboxyl group-containing polymerizable unsaturated monomer ($II_2$) and another polymerizable unsaturated monomer ($II_3$).

Examples for the polymerizable unsaturated monomer ($I_1$) with two or more polymerizable unsaturated groups in the molecule, which is to form the core section copolymer (I), include allyl (meth)acrylate, ethylene glycol di(meth)acrylate, triethylene glycol di(meth)acrylate, tetraethylene glycol di(meth)acrylate, 1,3-butylene glycol di(meth)acrylate, trimethylolpropane tri(meth)acrylate, 1,4-butanediol di(meth)acrylate, neopentyl glycol di(meth)acrylate, 1,6-hexanediol di(meth)acrylate, pentaerythritol di(meth)acrylate, pentaerythritol tetra(meth)acrylate, glycerol di(meth)acrylate, 1,1,1-trishydroxymethylethane di(meth)acrylate, 1,1,1-trishydroxymethylethane tri(meth)acrylate, 1,1,1-trishydroxymethylpropane tri(meth)acrylate, triallyl isocyanurate, diallyl terephthalate, divinylbenzene, methylenebis(meth)acrylamide, ethylenebis(meth)acrylamide, and any desired combinations of the foregoing.

The polymerizable unsaturated monomer ($I_1$) with two or more polymerizable unsaturated groups in the molecule has the function of imparting a crosslinked structure to the core section copolymer (I). The core section copolymer (I) contains the polymerizable unsaturated monomer ($I_1$) with two or more polymerizable unsaturated groups in the molecule in the range of preferably about 0.1 to about 30 mass %, more preferably about 0.5 to about 10 mass % and even more preferably about 1 to about 7 mass %, as a copolymerizing component, based on the total mass of the copolymerizing components composing the core section copolymer (I).

The polymerizable unsaturated monomer ($I_2$) with one polymerizable unsaturated group in the molecule, that is to form the core section copolymer (I), is a polymerizable unsaturated monomer that is copolymerizable with the polymerizable unsaturated monomer ($I_1$) with two or more polymerizable unsaturated groups in the molecule.

Specific examples for the polymerizable unsaturated monomer ($I_2$) with one polymerizable unsaturated group in the molecule, among the polymerizable unsaturated monomers mentioned as examples of hydroxyl-containing polymerizable unsaturated monomers ($a_1$) and other polymerizable unsaturated monomers ($a_2$) listed in explaining the hydroxyl-containing acrylic resin ($A_1$), include monomers such as (i) to (xi), (xiii) to (xix) which are polymerizable unsaturated monomers other than the polymerizable unsaturated monomer ($I_1$) with two or more polymerizable unsaturated groups in the molecule, as well as any desired combinations of the foregoing.

From the viewpoint of the smoothness and sharpness of the coating film that is to be formed, there is preferably included a hydrophobic polymerizable unsaturated monomer as at least one polymerizable unsaturated monomer ($I_2$) with one polymerizable unsaturated group in the molecule.

Throughout the present specification, the hydrophobic polymerizable unsaturated monomer referred to is a polymerizable unsaturated monomer having a C4 or greater, preferably C6-C18 straight, branched or cyclic saturated or unsaturated hydrocarbon group, excluding monomers having hydrophilic groups such as hydroxyl-containing polymerizable unsaturated monomers.

Examples for the hydrophobic polymerizable unsaturated monomer include alkyl or cycloalkyl (meth)acrylates such as n-butyl (meth)acrylate, isobutyl (meth)acrylate, tert-butyl (meth)acrylate, pentyl (meth)acrylate, hexyl (meth)acrylate, octyl (meth)acrylate, 2-ethylhexyl (meth)acrylate, nonyl (meth)acrylate, tridecyl (meth)acrylate, lauryl (meth)acrylate, stearyl (meth)acrylate, isostearyl (meth)acrylate, cyclohexyl (meth)acrylate, methylcyclohexyl (meth)acrylate, tert-butylcyclohexyl (meth)acrylate, cyclododecyl (meth)acrylate and tricyclodecanyl (meth)acrylate; polymerizable unsaturated compounds with isobornyl groups such as isobornyl (meth)acrylate; polymerizable unsaturated compounds with adamantyl groups such as adamantyl (meth)acrylate; aromatic ring-containing polymerizable unsaturated monomers such as benzyl (meth)acrylate, styrene, α-methylstyrene and vinyltoluene, and any desired combinations of the foregoing.

From the viewpoint of sharpness of the coating film that is to be formed, the hydrophobic polymerizable unsaturated monomer is preferably at least one polymerizable unsaturated monomer selected from the group consisting of n-butyl (meth)acrylate, 2-ethylhexyl (meth)acrylate and styrene.

For an embodiment in which the core section copolymer (I) includes the hydrophobic polymerizable unsaturated monomer as a copolymerizing component, the core section copolymer (I) contains the hydrophobic polymerizable unsaturated monomer as a copolymerizing component preferably at about 5 to about 90 mass %, based on the total mass of the copolymerizing components that are to compose the core section copolymer (I). This is from the viewpoint of stability in the aqueous medium of the core-shell type water-dispersible hydroxyl-containing acrylic resin ($A_{111}$) and the smoothness and sharpness of the coating film that is to be obtained.

The shell section copolymer (II) contains a hydroxyl-containing polymerizable unsaturated monomer ($II_1$), a carboxyl group-containing polymerizable unsaturated monomer ($II_2$) and another polymerizable unsaturated monomer ($II_3$), as copolymerizing components.

The hydroxyl-containing polymerizable unsaturated monomer ($II_1$) which is to form the shell section copolymer (II) has the function of increasing the water resistance of the coating film by introducing hydroxyl groups, that undergo crosslinking reaction with the block polyisocyanate compound (B), into the core-shell type water-dispersible hydroxyl-containing acrylic resin ($A_{111}$) that is to be obtained, as well as improving the stability of the core-shell type water-dispersible hydroxyl-containing acrylic resin ($A_{111}$) in the aqueous medium.

Examples for the hydroxyl-containing polymerizable unsaturated monomer ($II_1$) include monoesterified products of (meth)acrylic acid and approximately C2-C8 dihydric alcohols, such as 2-hydroxyethyl (meth)acrylate, 2-hydroxypropyl (meth)acrylate, 3-hydroxypropyl (meth)acrylate and 4-hydroxybutyl (meth)acrylate; ε-caprolactone-modified forms of monoesterified products of the (meth)acrylic acid and approximately C2-C8 dihydric alcohols; N-hydroxymethyl (meth)acrylamide; allyl alcohols, and (meth)acrylates having polyoxyethylene chains with hydroxyl group molecular ends, as well as any desired combinations of the foregoing.

The hydroxyl-containing polymerizable unsaturated monomer ($II_1$) is preferably selected from the group consisting of 2-hydroxyethyl (meth)acrylate, 2-hydroxypropyl (meth)acrylate, 3-hydroxypropyl (meth)acrylate and 4-hydroxybutyl (meth)acrylate, as well as any desired combinations of the foregoing, and more preferably it is 2-hydroxyethyl (meth)acrylate.

The shell section copolymer (II) contains the hydroxyl-containing polymerizable unsaturated monomer ($II_1$) in the range of preferably about 1 to about 40 mass %, more preferably about 4 to about 25 mass % and even more preferably about 7 to about 19 mass %, based on the total mass of the copolymerizing components that are to compose the shell section copolymer (II). This is from the viewpoint of stability in the aqueous medium of the core-shell type water-dispersible hydroxyl-containing acrylic resin ($A_{111}$) and improving the water resistance of the coating film that is to be obtained.

Examples for the carboxyl group-containing polymerizable unsaturated monomer ($II_2$) that is to compose the shell section copolymer (II) include the carboxyl group-containing polymerizable unsaturated monomers (x) listed as other polymerizable unsaturated monomers ($a_2$) in explaining the hydroxyl-containing acrylic resin ($A_1$). The carboxyl group-containing polymerizable unsaturated monomer ($II_2$) is preferably selected from the group consisting of acrylic acid and methacrylic acid, and combinations thereof. If the shell section contains a carboxyl group-containing polymerizable unsaturated monomer ($II_2$) as a copolymerizing component, it will be possible to ensure stability of the core-shell type water-dispersible hydroxyl-containing acrylic resin ($A_{111}$) in the aqueous medium.

The shell section copolymer (II) contains the carboxyl group-containing polymerizable unsaturated monomer ($II_2$) as a copolymerizing component, at preferably about 0.1 to about 30 mass %, more preferably about 2 to about 25 mass % and even more preferably about 3 to about 19 mass %, based on the total mass of the copolymerizing components that are to compose the shell section copolymer (II). This is from the viewpoint of stability in the aqueous medium of the core-shell type water-dispersible hydroxyl-containing acrylic resin ($A_{111}$) and improving the water resistance of the coating film that is to be obtained.

The other polymerizable unsaturated monomer ($II_3$) that is to form the shell section copolymer (II) is a polymerizable unsaturated monomer other than the hydroxyl-containing polymerizable unsaturated monomer ($II_1$) and carboxyl group-containing polymerizable unsaturated monomer ($II_2$). Examples for the other polymerizable unsaturated monomer ($II_3$) include alkyl or cycloalkyl (meth)acrylates such as methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, pentyl (meth)acrylate, hexyl (meth)acrylate, octyl (meth)acrylate, 2-ethylhexyl (meth)acrylate, nonyl (meth)acrylate, dodecyl (meth)acrylate, tridecyl (meth)acrylate, stearyl (meth)acrylate, isostearyl (meth)acrylate, cyclohexyl (meth)acrylate, methylcyclohexyl (meth)acrylate, tert-butylcyclohexyl (meth)acrylate, cyclododecyl (meth)acrylate and tricyclodecanyl (meth)acrylate; polymerizable unsaturated compounds with isobornyl groups such as isobornyl (meth)acrylate; polymerizable unsaturated compounds with adamantyl groups such as adamantyl (meth)acrylate; aromatic ring-containing polymerizable unsaturated monomers such as benzyl (meth)acrylate, styrene, α-methylstyrene and vinyltoluene, and any desired combinations of the foregoing.

Preferred as the other polymerizable unsaturated monomer ($II_3$) that is to form the shell section copolymer (II) is one that includes no polymerizable unsaturated monomer with two or more polymerizable unsaturated groups in the molecule as a copolymerizing component, but one wherein the shell section copolymer (II) is non-crosslinked, from the viewpoint of improving the brightness of the coating film that is to be obtained.

The core section copolymer (I)/shell section copolymer (II) proportion in the core-shell type water-dispersible hydroxyl-containing acrylic resin ($A_{111}$) is preferably about 5/95 to about 95/5, more preferably about 50/50 to about 85/15 and even more preferably about 60/40 to about 80/20, as the solid mass ratio, from the viewpoint of improving the sharpness and brightness of the coating film that is to be formed.

The core-shell type water-dispersible hydroxyl-containing acrylic resin ($A_{111}$) has a hydroxyl value of preferably about 1 to about 200 mgKOH/g, more preferably about 3 to about 150 mgKOH/g and even more preferably about 5 to about 100 mgKOH/g, from the viewpoint of improving the chipping resistance and water resistance of the coating film that is to be obtained.

Also, the core-shell type water-dispersible hydroxyl-containing acrylic resin ($A_{111}$) has an acid value of preferably about 40 mgKOH/g or less, more preferably about 0.1 to about 30 mgKOH/g and even more preferably about 1 to about 20 mgKOH/g, from the viewpoint of improving the storage stability of the coating material and the adhesion, smoothness, sharpness and water resistance of the coating film that is to be formed.

The aqueous coating composition contains the core-shell type water-dispersible hydroxyl-containing acrylic resin ($A_{111}$) at preferably about 2 to about 95 mass %, more preferably about 10 to about 75 mass % and even more preferably about 15 to about 60 mass %, based on the total solid content of the hydroxyl-containing resin (A) and the block polyisocyanate compound (B).

According to one embodiment of the aqueous coating composition, the core-shell type water-dispersible hydroxyl-containing acrylic resin ($A_{111}$) can be obtained by emulsion polymerization of a monomer mixture comprising about 0.1 to about 30 mass % of a polymerizable unsaturated monomer ($I_1$) with two or more polymerizable unsaturated groups in the molecule and about 70 to about 99.9 mass % of a polymerizable unsaturated monomer ($I_2$) with one polymerizable unsaturated group in the molecule, to obtain an emulsion of a core section copolymer (I), and then adding to the emulsion a monomer mixture comprising about 1 to about 40 mass % of a hydroxyl-containing polymerizable unsaturated monomer ($II_1$), about 0.1 to about 30 mass % of a carboxyl group-containing polymerizable unsaturated monomer ($II_2$) and about 30 to about 98.9 mass % of another polymerizable unsaturated monomer ($II_3$), and further conducting emulsion polymerization to form a shell section copolymer (II).

The emulsion polymerization used to prepare an emulsion of the core section copolymer (I) may be carried out by a known method. For example, the emulsion polymerization can be carried out by adding a polymerization initiator to a mixture of the aforementioned monomers in the presence of a surfactant.

Surfactants include anionic surfactants and nonionic surfactants. Examples of anionic surfactants include sodium salts and ammonium salts of alkylsulfonic acids, alkylbenzenesulfonic acids and alkylphosphoric acids. Examples for the nonionic surfactant include polyoxyethylene oleyl ether, polyoxyethylene stearyl ether, polyoxyethylene lauryl ether, polyoxyethylene tridecyl ether, polyoxyethylene phenyl ether, polyoxyethylene nonylphenyl ether, polyoxyethylene octylphenyl ether, polyoxyethylene monolaurate, polyoxyethylene monostearate, polyoxyethylene monooleate, sorbitan monolaurate, sorbitan monostearate, sorbitan trioleate and polyoxyethylenesorbitan monolaurate.

Also, the anionic surfactant may be a polyoxyalkylene group-containing anionic surfactant having an anionic group and a polyoxyalkylene group such as polyoxyethylene or polyoxypropylene in the molecule; or a reactive anionic surfactant having an anionic group and a radical polymerizable unsaturated group in the molecule, with reactive anionic surfactants being preferred.

The reactive anionic surfactant may be a sodium salt or ammonium salt of a sulfonic acid compound having a radical polymerizable unsaturated group such as allyl, methallyl, (meth)acryloyl, propenyl or butenyl, with ammonium salts of sulfonic acid compounds having radical polymerizable unsaturated groups being preferred for excellent water resistance of the coating film that is to be obtained. An example of a commercial ammonium salt of a sulfonic acid compound is "LATEMUL S-180A" (trade name of Kao Corp.).

Among ammonium salts of sulfonic acid compounds with radical polymerizable unsaturated groups, there are preferred ammonium salts of sulfonic acid compounds having radical polymerizable unsaturated groups and polyoxyalkylene groups. Example of commercial products of ammonium salts of sulfonic acid compounds with radical polymerizable unsaturated groups and polyoxyalkylene groups include "AQUALON KH-10" (trade name of Dai-ichi Kogyo Seiyaku Co., Ltd.), "LATEMUL PD-104" (trade name of Kao Corp.) and "ADEKA REASOAP SR-1025" (trade name of Adeka Corp.).

The emulsion polymerization is carried out by adding the surfactant to the reaction system, preferably at about 0.1 to about 15 mass %, more preferably at about 0.5 to about 10 mass % and even more preferably at about 1 to about 5 mass %, based on the total mass of all of the monomers.

Examples for the polymerization initiator include organic peroxides such as benzoyl peroxide, octanoyl peroxide, lauroyl peroxide, stearoyl peroxide, cumene hydroperoxide, tert-butyl peroxide, di-tert-amyl peroxide, tert-butylperoxy-2-ethyl hexanoate, tert-butyl peroxylaurate, tert-butylperoxyisopropyl carbonate, tert-butyl peroxyacetate and diisopropylbenzene hydroperoxide; azo compounds such as azobisisobutyronitrile, azobis(2,4-dimethylvaleronitrile), azobis(2-methylpropionitrile), azobis(2-methylbutyronitrile), 4,4'-azobis(4-cyanobutanoic acid), dimethylazobis(2-methyl propionate), azobis[2-methyl-N-(2-hydroxyethyl)-propionamide] and azobis{2-methyl-N-[2-(1-hydroxybutyl)]-propionamide}; persulfuric acid salts such as potassium persulfate, ammonium persulfate and sodium persulfate, and any desired combinations of the foregoing. If desired, a reducing agent such as a sugar, sodium formaldehyde sulfoxylate or an iron complex may be used with the polymerization initiator, for use as a redox initiator.

The emulsion polymerization is carried out by adding the polymerization initiator to the reaction system, preferably at about 0.1 to about 5 mass % and more preferably at about 0.2 to about 3 mass %, based on the total mass of all of the monomers. The polymerization initiator may be added according to its type and amount, without any particular restrictions. For example, the polymerization initiator may be added beforehand to the monomer mixture or aqueous medium, or the polymerization initiator may be added directly to the reaction system all at once during polymerization, or in a dropwise manner.

According to one embodiment of the aqueous coating composition, the core-shell type water-dispersible hydroxyl-containing acrylic resin ($A_{111}$) is obtained by adding a monomer mixture comprising a hydroxyl-containing polymerizable unsaturated monomer ($II_1$), a carboxyl group-containing polymerizable unsaturated monomer ($II_2$) and another polymerizable unsaturated monomer ($II_3$) to an emulsion of the core section copolymer (I), and conducting further polymerization to form the shell section copolymer (II).

The monomer mixture that is to form the shell section copolymer (II) may appropriately include components such as polymerization initiators, chain transfer agents, reducing agents, surfactants and the like as desired. Also, although the monomer mixture may be added as is to the reaction system, preferably it is added dropwise to the reaction system as a monomer emulsion obtained by dispersing the monomer mixture in an aqueous medium. The particle size of the monomer emulsion is not particularly restricted.

According to one embodiment of the aqueous coating composition, the monomer mixture that is to form the shell section copolymer (II) is formed, for example, by adding the monomer mixture or its emulsion to the reaction system either all at once or in a slow dropwise fashion, and heating to a suitable temperature while stirring, as a method for forming the shell section copolymer (II) around the core section copolymer (I). The core-shell type water-dispersible hydroxyl-containing acrylic resin ($A_{111}$) obtained in this manner has a multilayer structure with a core section of a copolymer (I) of a polymerizable unsaturated monomer ($I_1$) with two or more polymerizable unsaturated groups in the molecule and a polymerizable unsaturated monomer ($I_2$) with one polymerizable unsaturated group in the molecule, and a shell section of a copolymer (II) of a hydroxyl-containing polymerizable unsaturated monomer ($II_1$), a carboxyl group-containing polymerizable unsaturated monomer ($II_2$) and another polymerizable unsaturated monomer ($II_3$).

Also, according to one embodiment of the aqueous coating composition, the core-shell type water-dispersible hydroxyl-containing acrylic resin ($A_{111}$) may be a water-dispersible hydroxyl-containing acrylic resin composed of 3 or more layers, by adding a step of supplying a polymerizable unsaturated monomer that is to form another resin layer (a mixture of one or more compounds) for emulsion polymerization, between the step of obtaining the core section copolymer (I) and the step of obtaining the shell section copolymer (II).

According to the invention, "shell section" of the core-shell type water-dispersible hydroxyl-containing acrylic resin means the polymer layer present on the outermost layer of the resin particles, "core section" means the polymer layer on the inner layer of the resin particles excluding the shell section, and "core-shell type structure" means the structure comprising the core section and the shell section.

The core-shell type structure will usually be a layered structure with the core section totally covered by the shell section, but depending on the mass ratio of the core section and shell section, the amount of monomer of the shell section may be insufficient to form a layered structure. In such cases, it is not necessary for it to be a completely layered structure as described above, but instead it may be a structure wherein a portion of the core section is covered by the shell section. The concept of a multilayer structure in the core-shell type structure likewise applies when a multilayer structure is to be formed on the core section in the core-shell type water-dispersible hydroxyl-containing acrylic resin ($A_{111}$).

The core-shell type water-dispersible hydroxyl-containing acrylic resin ($A_{111}$) may generally have a mean particle size in the range of about 10 to about 1,000 nm, and especially about 20 to about 500 nm.

The mean particle size of the core-shell type water-dispersible hydroxyl-containing acrylic resin ($A_{111}$) referred to throughout the present specification is the value measured using a submicron particle size distribution analyzer at 20° C., after dilution with deionized water by a common method. As an example of a submicron particle size distribution analyzer, there may be used a "COULTER N4" (trade name of Beckman Coulter, Inc.).

In order to improve the mechanical stability of the particles of the core-shell type water-dispersible hydroxyl-containing acrylic resin ($A_{111}$), the acidic groups such as carboxyl groups of the core-shell type water-dispersible hydroxyl-containing acrylic resin ($A_{111}$) are preferably neutralized with a neutralizing agent. There are no particular restrictions on the neutralizing agent so long as it can neutralize the acidic groups, and examples include sodium hydroxide, potassium hydroxide, trimethylamine, 2-(dimethylamino)ethanol, 2-amino-2-methyl-1-propanol, triethylamine and ammonia water. The neutralizing agent is preferably used in an amount such that the pH of an aqueous dispersion of the core-shell type water-dispersible hydroxyl-containing acrylic resin ($A_{111}$) after neutralization is between about 6.5 and about 9.0.

[Hydroxyl-Containing Polyester Resin ($A_2$)]

The hydroxyl-containing polyester resin ($A_2$) can usually be produced by esterification reaction or transesterification reaction between an acid component and an alcohol component.

The acid component may be a compound that is commonly used as an acid component for production of polyester resins. Examples for the acid component include aliphatic polybasic acids, alicyclic polybasic acids and aromatic polybasic acids, as well as their anhydrides and ester compounds.

Aliphatic polybasic acids and their anhydrides and ester compounds generally include aliphatic compounds with two or more carboxyl groups in the molecule, acid anhydrides of such aliphatic compounds and esterified forms of such aliphatic compounds, examples of which include aliphatic polybasic carboxylic acids such as succinic acid, glutaric acid, adipic acid, pimelic acid, suberic acid, azelaic acid, sebacic acid, undecanedioic acid, dodecanedioic acid, brassylic acid, octadecanedioic acid, citric acid and butanetetracarboxylic acid; anhydrides of these aliphatic polybasic carboxylic acids; approximately C1-C4 lower alkyl esters of these aliphatic polybasic carboxylic acids, and any desired combinations of the foregoing.

The aliphatic polybasic acids are preferably adipic acid and/or adipic anhydride, from the viewpoint of smoothness of the coating film that is to be obtained.

These alicyclic polybasic acids and their anhydrides and ester compounds generally include compounds having one or more alicyclic structures and two or more carboxyl groups in the molecule, acid anhydrides of such compounds, and esters of such compounds. An alicyclic structure is mainly a 4- to 6-membered cyclic structure. Examples of alicyclic polybasic acids and their anhydrides and esters include alicyclic polybasic carboxylic acids such as 1,2-cyclohexanedicarboxylic acid, 1,3-cyclohexanedicarboxylic acid, 1,4-cyclohexanedicarboxylic acid, 4-cyclohexene-1,2-dicarboxylic acid, 3-methyl-1,2-cyclohexanedicarboxylic acid, 4-methyl-1,2-cyclohexanedicarboxylic acid, 1,2,4-cyclohexanetricarboxylic acid and 1,3,5-cyclohexanetricarboxylic acid; anhydrides of these alicyclic polybasic carboxylic acids; approximately C1-C4 lower alkyl esters of these alicyclic polybasic carboxylic acids, and any desired combinations of the foregoing.

From the viewpoint of smoothness of the coating film that is to be obtained, the alicyclic polybasic acids and their anhydrides and esters are preferably 1,2-cyclohexanedicarboxylic acid, 1,2-cyclohexanedicarboxylic anhydride, 1,3-cyclohexanedicarboxylic acid, 1,4-cyclohexanedicarboxylic acid, 4-cyclohexene-1,2-dicarboxylic acid and 4-cyclohexene-1,2-dicarboxylic anhydride, and more preferably 1,2-cyclohexanedicarboxylic acid and/or 1,2-cyclohexanedicarboxylic anhydride.

The aromatic polybasic acids and their anhydrides and esters are generally aromatic compounds with two or more carboxyl groups in the molecule, acid anhydrides of such aromatic compounds and esters of such aromatic compounds, examples of which include aromatic polybasic carboxylic acids such as phthalic acid, isophthalic acid, terephthalic acid, naphthalenedicarboxylic acid, 4,4'-biphenyldicarboxylic acid, trimellitic acid and pyromellitic acid; anhydrides of these aromatic polybasic carboxylic acids; approximately C1-C4 lower alkyl esters of these aromatic polybasic carboxylic acids, and any desired combinations of the foregoing.

Preferred as the aromatic polybasic acids and their anhydrides and esters are phthalic acid, phthalic anhydride, isophthalic acid, trimellitic acid and trimellitic anhydride.

Also, the acid component may be an acid component other than the aforementioned aliphatic polybasic acids, alicyclic polybasic acids and aromatic polybasic acids, examples including fatty acids such as coconut fatty acid, cottonseed oil fatty acid, hempseed oil fatty acid, rice bran oil fatty acid, fish oil fatty acid, tall oil fatty acid, soybean oil fatty acid, linseed oil fatty acid, China wood oil fatty acid, rapeseed oil fatty acid, castor oil fatty acid, dehydrated castor oil fatty acid and safflower oil fatty acid; monocarboxylic acids such as lauric acid, myristic acid, palmitic acid, stearic acid, oleic acid, linolic acid, linolenic acid, benzoic acid, p-tert-butylbenzoic acid, cyclohexanoic acid and 10-phenyloctadecanoic acid; and hydroxycarboxylic acids such as lactic acid, 3-hydroxybutanoic acid and 3-hydroxy-4-ethoxybenzoic acid, as well as any desired combinations of the foregoing.

The alcohol component may be a polyhydric alcohol with two or more hydroxyl groups in the molecule, examples of which include dihydric alcohols such as ethylene glycol, propylene glycol, diethylene glycol, trimethylene glycol, tetraethylene glycol, triethylene glycol, dipropylene glycol, 1,4-butanediol, 1,3-butanediol, 2,3-butanediol, 1,2-butanediol, 2-methyl-1,3-propanediol, 3-methyl-1,2-butanediol, 2-butyl-2-ethyl-1,3-propanediol, 1,2-pentanediol, 1,5-pentanediol, 1,4-pentanediol, 2,4-pentanediol, 2,3-dimethyltrimethylene glycol, tetramethylene glycol, 3-methyl-4,3-pentanediol, 3-methyl-1,5-pentanediol, 2,2,4-trimethyl-1,3-pentanediol, 1,6-hexanediol, 1,5-hexanediol, 1,4-hexanediol, 2,5-hexanediol, neopentyl glycol, 1,4-cyclohexanedimethanol, tricyclodecanedimethanol, hydroxypivalic acid neopentyl glycol ester, hydrogenated bisphenol A, hydrogenated bisphenol F and dimethylolpropionic acid; polylactonediols with lactone compounds such as ε-caprolactone added to the aforementioned dihydric alcohols; ester diol compounds such as bis(hydroxyethyl) terephthalate; polyether diol compounds such as bisphenol A alkylene oxide addition products, polyethylene glycol, polypropylene glycol and polybutylene glycol; trihydric and greater alcohols such as glycerin, trimethylolethane, trimethylolpropane, diglycerin, triglycerin, 1,2,6-hexanetriol, pentaerythritol, dipentaerythritol, tris(2-hydroxyethyl)isocyanuric acid, sorbitol and mannitol; polylactone polyol compounds with lactone compounds such as ε-caprolactone added to the aforementioned trihydric and greater alcohols; and fatty acid esterified glycerin.

The alcohol component may also be an alcohol component other than the aforementioned polyhydric alcohols, examples of which include monoalcohols such as methanol, ethanol, propyl alcohol, butyl alcohol, stearyl alcohol and 2-phenoxyethanol; and alcohol compounds obtained by reacting acids with monoepoxy compounds such as propylene oxide, butylene oxide, "CARDURA E10" (trade name of HEXION Specialty Chemicals, glycidyl ester of synthetic highly-branched saturated fatty acid), and the like.

The hydroxyl-containing polyester resin ($A_2$) may be produced by a common method without any particular restrictions. For example, the acid component and the alcohol component may be heated in a nitrogen stream at about 150 to about 250° C. for about 5 to about 10 hours for esterification reaction or transesterification reaction between the acid component and the alcohol component, to produce the hydroxyl-containing polyester resin ($A_2$)

When the acid component and alcohol component are subjected to esterification reaction or transesterification reaction, they may be added all at once to the reactor, or one or both may be added in separate portions. After the hydroxyl-containing polyester resin has been synthesized, an acid anhydride may be reacted with the obtained hydroxyl-containing polyester resin for half-esterification, to produce a carboxyl- and hydroxyl-containing polyester resin. Also, after the carboxyl group-containing polyester resin has been synthesized, the alcohol component may be added to the carboxyl group-containing polyester resin to produce the hydroxyl-containing polyester resin ($A_2$)

During the esterification or transesterification reaction, a known catalyst such as dibutyltin oxide, antimony trioxide, zinc acetate, manganese acetate, cobalt acetate, calcium acetate, lead acetate, tetrabutyl titanate or tetraisopropyl titanate may be added to the reaction system as a catalyst to accelerate the reaction.

Also, the hydroxyl-containing polyester resin ($A_2$) may be one that has been modified with a fatty acid, monoepoxy compound, polyisocyanate compound or the like either during or after preparation of the resin.

Examples for the fatty acid include coconut fatty acid, cottonseed oil fatty acid, hempseed oil fatty acid, rice bran oil fatty acid, fish oil fatty acid, tall oil fatty acid, soybean oil fatty acid, linseed oil fatty acid, China wood oil fatty acid, rapeseed oil fatty acid, castor oil fatty acid, dehydrated castor oil fatty acid and safflower oil fatty acid, and a preferred example for the monoepoxy compound is "CARDURA E10" (trade name of HEXION Specialty Chemicals, glycidyl ester of synthetic highly-branched saturated fatty acid).

Examples for the polyisocyanate compound include aliphatic diisocyanate compounds such as lysine diisocyanate, hexamethylene diisocyanate and trimethylhexane diisocyanate; alicyclic diisocyanate compounds such as hydrogenated xylylene diisocyanate, isophorone diisocyanate, methylcyclohexane-2,4-diisocyanate, methylcyclohexane-2,6-diisocyanate, 4,4'-methylenebis(cyclohexyl isocyanate) and 1,3-(isocyanatomethyl)cyclohexane; aromatic diisocyanate compounds such as tolylene diisocyanate, xylylene diisocyanate and diphenylmethane diisocyanate; organic polyisocyanates including trivalent and greater polyisocyanates such as lysine triisocyanate; addition products of the aforementioned organic polyisocyanates with polyhydric alcohols, low molecular weight polyester resins, water or the like; cyclized polymers formed between the aforementioned organic polyisocyanates (for example, isocyanurates), biuret-type addition products, and any desired combinations of the foregoing.

Also, from the viewpoint of improving the smoothness and water resistance of the coating film that is to be obtained, the content of the alicyclic polybasic acid among the acid components of the starting material for the hydroxyl-containing polyester resin ($A_2$) is preferably about 20 to about 100 mol %, more preferably about 25 to about 95 mol % and even more preferably about 30 to about 90 mol %, based on the total amount of the acid components. Most preferably, the alicyclic polybasic acid is 1,2-cyclohexanedicarboxylic acid and/or 1,2-cyclohexanedicarboxylic anhydride, from the viewpoint of improving the smoothness of the coating film that is to be obtained.

The hydroxyl-containing polyester resin ($A_2$) has a hydroxyl value of preferably about 1 to about 200 mgKOH/g, more preferably about 2 to about 180 mgKOH/g and even more preferably about 5 to about 170 mgKOH/g.

For an embodiment wherein the hydroxyl-containing polyester resin ($A_2$) has a carboxyl group, the hydroxyl-containing polyester resin ($A_2$) has an acid value of preferably about 0.1 to about 100 mgKOH/g, more preferably about 0.5 to about 60 mgKOH/g and even more preferably about 1 to about 50 mgKOH/g.

Also, the hydroxyl-containing polyester resin ($A_2$) has a number-average molecular weight of preferably about 500 to about 50,000, more preferably about 1,000 to about 30,000 and even more preferably about 1,200 to about 10,000.

For an embodiment in which the aqueous coating composition contains a hydroxyl-containing polyester resin ($A_2$) as the hydroxyl-containing resin (A), the aqueous coating composition contains the hydroxyl-containing polyester resin ($A_2$) at preferably about 2 to about 95 mass %, more preferably about 10 to about 70 mass % and even more preferably about 15 to about 50 mass %, based on the total solid content of the hydroxyl-containing resin (A) and the block polyisocyanate compound (B).

[Hydroxyl-Containing Polyurethane Resin ($A_3$)]

Examples for the hydroxyl-containing polyurethane resin ($A_3$) include resins produced by reacting at least one diisocyanate compound selected from the group consisting of aliphatic diisocyanate compounds, alicyclic diisocyanate compounds and aromatic diisocyanate compounds with at least one polyol compound selected from the group consisting of polyether polyols, polyester polyols and polycarbonate polyols.

Specifically, the hydroxyl-containing polyurethane resin ($A_3$) can be produced in the following manner.

For example, a urethane prepolymer is produced by reacting at least one diisocyanate selected from the group consisting of aliphatic diisocyanates and alicyclic diisocyanates, at least one diol selected from the group consisting of polyether diols, polyester diols and polycarbonate diols, a low-molecular-weight polyhydroxy compound and a dimethylolalkanoic acid. A self-emulsifiable hydroxyl-containing polyurethane resin ($A_3$) having a mean particle size of about 0.001 to about 3 μm can be obtained by neutralizing the urethane prepolymer with a tertiary amine and forming an emulsified dispersion of the neutralized product in water, and then optionally mixing it with an aqueous medium containing a chain extension agent, such as a polyamine, a crosslinking agent, a terminator or the like, and reacting until the isocyanate groups substantially disappear.

For an embodiment in which the aqueous coating composition contains a hydroxyl-containing polyurethane resin ($A_3$) as the hydroxyl-containing resin (A), the aqueous coating composition contains the hydroxyl-containing polyurethane resin ($A_3$) at preferably about 2 to about 90 mass %, more preferably about 5 to about 70 mass % and even more preferably about 8 to about 50 mass %, based on the total solid content of the hydroxyl-containing resin (A) and the block polyisocyanate compound (B).

As the solid mass ratio of the aqueous coating composition contains the hydroxyl-containing resin (A) and the block polyisocyanate compound (B) (hydroxyl-containing resin (A)/block polyisocyanate compound (B)), they are present in a range of preferably about 95/5 to about 10/90, more preferably about 90/10 to about 30/70 and even more preferably about 85/15 to about 50/50. This is from the viewpoint of the adhesion, smoothness, sharpness, water resistance and chipping resistance of the coating film that is to be formed.

Also, for one embodiment of the aqueous coating composition, the aqueous coating composition further contains a curing agent other than the block polyisocyanate compound (B). The curing agent may be a known curing agent, and especially an amino resin.

The amino resin may be a partial methylolated amino resin or total methylolated amino resin, obtained by reacting an amino component and an aldehyde component. Examples of such amino components include melamine, urea, benzoguanamine, acetoguanamine, steroguanamine, spiroguanamine and dicyandiamide. Examples of aldehyde components include formaldehyde, paraformaldehyde, acetaldehyde and benzaldehyde.

Also, the amino resin may be one wherein the methylol groups of a methylolated amino resin are partially or totally etherified with an alcohol. Examples of alcohols to be used for the etherification include methyl alcohol, ethyl alcohol, n-propyl alcohol, isopropyl alcohol, n-butyl alcohol, isobutyl alcohol, 2-ethylbutanol and 2-ethylhexanol.

The amino resin is preferably a melamine resin, and most preferably it is a methyl etherified melamine resin wherein the methylol groups of a partially or totally methylolated melamine resin are partially or totally etherified with methyl alcohol, a butyl etherified melamine resin wherein the methylol groups of a partially or totally methylolated melamine resin are partially or totally etherified with butyl alcohol, or a methyl-butyl mixed etherified melamine resin wherein the methylol groups of a partially or totally methylolated melamine resin are partially or totally etherified with methyl alcohol and butyl alcohol.

Also, from the viewpoint of improving the water resistance of the coating film that is to be obtained, the melamine resin has a weight-average molecular weight of preferably about 400 to about 6,000, more preferably about 500 to about 4,000 and even more preferably about 600 to about 3,000.

Melamine resins are commercially available, and examples include "SAIMEL 202", "SAIMEL 203", "SAIMEL 238", "SAIMEL 251", "SAIMEL 303", "SAIMEL 323", "SAIMEL 324", "SAIMEL 325", "SAIMEL 327", "SAIMEL 350", "SAIMEL 385", "SAIMEL 1156", "SAIMEL 1158", "SAIMEL 1116" and "SAIMEL 1130" (all products of Nihon Cytec Industries Inc.), and "U-VAN 120", "U-VAN 20HS", "U-VAN 20SE60", "U-VAN 2021", "U-VAN 2028" and "U-VAN 28-60" (all products of Mitsui Chemicals, Inc.).

For an embodiment in which the aqueous coating composition contains a melamine resin as the curing agent, the aqueous coating composition contains the melamine resin in a range of preferably about 1 to about 50 parts by mass and more preferably about 5 to about 30 parts by mass, based on 100 parts by mass as the total solid content of the hydroxyl-containing resin (A) and the block polyisocyanate compound (B).

In a preferred embodiment of the aqueous coating composition, the aqueous coating composition further contains a pigment. Examples for the pigment include color pigments, extender pigments and brightness pigments, as well as any desired combinations of the foregoing.

The pigment is preferably a color pigment and/or extender pigment, the aqueous coating composition containing the color pigment and extender pigment in a range of preferably about 1 to about 500 parts by mass, more preferably about 3 to about 400 parts by mass and even more preferably about 5 to about 300 parts by mass in total, based on 100 parts by mass as the total solid content of the hydroxyl-containing resin (A) and the block polyisocyanate compound (B).

Examples for the color pigment include titanium oxide, zinc oxide, carbon black, molybdenum red, Prussian blue, cobalt blue, azo-based pigments, phthalocyanine-based pigments, quinacridone-based pigments, isoindoline-based pigments, threne-based pigments, perylene-based pigments, dioxazine-based pigments, diketopyrrolopyrrole-based pigments and the like, as well as any desired combinations of the foregoing.

For an embodiment in which the aqueous coating composition contains the aforementioned color pigment, the aqueous coating composition contains the color pigment in a range of preferably about 1 to about 300 parts by mass, more preferably about 3 to about 250 parts by mass and even more preferably about 5 to about 200 parts by mass, based on 100 parts by mass as the total solid content of the hydroxyl-containing resin (A) and the block polyisocyanate compound (B).

Also, examples for the extender pigment include clay, kaolin, barium sulfate, barium carbonate, calcium carbonate, talc, silica, alumina white and the like, with barium sulfate and/or talc being preferred and barium sulfate being more preferred. In order to obtain a multilayer coating film having an outer appearance with excellent smoothness, the extender pigment is preferably barium sulfate having a mean primary particle size of 1 μm or less, and especially barium sulfate having a mean primary particle size in the range of about 0.01 to about 0.8 μm.

According to the invention, the mean primary particle size of barium sulfate is the value determined by observing the barium sulfate with a scanning electron microscope and averaging the maximum diameters of 20 barium sulfate particles on a straight line drawn randomly on the electron micrograph.

For an embodiment in which the aqueous coating composition contains the aforementioned extender pigment, the aqueous coating composition contains the extender pigment in a range of preferably about 1 to about 300 parts by mass, more preferably about 5 to about 250 parts by mass and even more preferably about 10 to about 200 parts by mass, based on 100 parts by mass as the total solid content of the hydroxyl-containing resin (A) and the block polyisocyanate compound (B).

Also, examples for the brightness pigment include aluminum (including vapor deposited aluminum), copper, zinc, brass, nickel, aluminum oxide, mica, aluminum oxide covered by titanium oxide or iron oxide, mica covered by titanium oxide or iron oxide, glass flakes, hologram pigments and the like, as well as any desired combinations of the foregoing. The aforementioned aluminum pigments include non-leafing-type aluminum and leafing-type aluminum.

For an embodiment in which the aqueous coating composition contains the aforementioned brightness pigment, the aqueous coating composition contains the brightness pigment in a range of preferably about 1 to about 50 parts by mass, more preferably about 2 to about 30 parts by mass and even more preferably about 3 to about 20 parts by mass, based on 100 parts by mass as the total solid content of the hydroxyl-containing resin (A) and the block polyisocyanate compound (B).

The aqueous coating composition of the invention preferably further contains a hydrophobic solvent from the viewpoint of the smoothness and sharpness of the coating film that is to be formed.

The hydrophobic solvent is an organic solvent with a soluble mass in 100 g of water at 20° C. of about 10 g or less, preferably about 5 g or less and more preferably about 1 g or less.

Examples for the hydrophobic solvent include hydrocarbon-based solvents such as rubber volatile oils, mineral spirits, toluene, xylene and solvent naphtha; alcohol-based solvents such as 1-hexanol, 1-octanol, 2-octanol, 2-ethyl-1-hexanol, 1-decanol, benzyl alcohol, ethylene glycol mono-2-ethylhexyl ether, propyleneglycol mono-n-butyl ether, dipropyleneglycol mono-n-butyl ether, tripropyleneglycol mono-n-butyl ether, propyleneglycol mono-2-ethylhexyl ether and propyleneglycol monophenyl ether; ester-based solvents such as n-butyl acetate, isobutyl acetate, isoamyl acetate, methylamyl acetate and ethylene glycol monobutyl acetate ether; ketone-based solvents such as methyl isobutyl ketone, cyclohexanone, ethyl-n-amyl ketone and diisobutyl ketone; and any desired combinations of the foregoing.

Preferred as the hydrophobic solvent are alcohol-based hydrophobic solvents, more preferred are approximately C7-C14 alcohol-based hydrophobic solvents, and even more preferred are one or more types of alcohol-based hydrophobic solvents selected from the group consisting of 1-octanol, 2-octanol, 2-ethyl-1-hexanol, ethylene glycol mono-2-ethylhexyl ether, propyleneglycol mono-n-butyl ether and dipropyleneglycol mono-n-butyl ether.

For an embodiment in which the aqueous coating composition contains a hydrophobic solvent, the aqueous coating composition contains the hydrophobic solvent in a range of preferably about 2 to about 100 parts by mass, more preferably about 5 to about 80 parts by mass and even more preferably about 8 to about 60 parts by mass, based on 100 parts by mass as the total solid content of the hydroxyl-containing resin (A) and the block polyisocyanate compound (B).

Also, the aqueous coating composition may further contain, optionally, paint additives such as thickening agents, curing catalysts, ultraviolet absorbers, light stabilizers, anti-foaming agents, plasticizers, organic solvents other than the aforementioned hydrophobic solvents, surface control agents, anti-settling agents and the like.

Examples for the thickening agent include inorganic thickening agents such as silicates, metal silicates, montmorillonite and colloidal alumina; polyacrylic acid-based thickening agents such as copolymers of (meth)acrylic acids and (meth)acrylic acid esters and sodium polyacrylate; associative thickening agents having a hydrophilic portion and a hydrophobic portion in the molecule and exhibiting a thickening effect when the hydrophobic portion is adsorbed onto the surface of the pigment or emulsion particle in the coating material in an aqueous medium, such that the hydrophobic portions become associated together; cellulosic derivative-based thickening agents such as carboxymethyl cellulose, methyl cellulose and hydroxyethyl cellulose; protein-based thickening agents such as casein, sodium caseinate and ammonium caseinate; alginic acid-based thickening agents such as sodium alginate; polyvinyl-based thickening agents such as polyvinyl alcohol, polyvinylpyrrolidone and polyvinylbenzyl ether copolymer; polyether-based thickening agents such as Pluronic polyethers, polyether dialkyl esters, polyether dialkyl ethers and polyether epoxy-modified compounds; maleic anhydride copolymer-based thickening agents such as partial esters of vinyl methyl ether-maleic anhydride copolymers; and polyamide-based thickening agents such as polyamide amine salts, as well as any desired combinations of the foregoing.

The aforementioned polyacrylic acid-based thickening agents are commercially available, and examples include "ACRYSOL ASE-60", "ACRYSOL TT-615" and "ACRYSOL RM-5" (all trade names) by Rohm & Haas, and "SN THICKENER 613", "SN THICKENER 618", "SN THICKENER 630", "SN THICKENER 634" and "SN THICKENER 636" (all trade names) by San Nopco, Ltd.

The aforementioned associative thickening agents are also commercially available, and examples include "UH-420", "UH-450", "UH-462", "UH-472", "UH-540", "UH-752", "UH-756 VF" and "UH-814N" (all trade names) by Adeka Corp., "ACRYSOL RM-8W", "ACRYSOL RM-825", "ACRYSOL RM-2020NPR", "ACRYSOL RM-12W" and "ACRYSOL SCT-275" (all trade names) by Rohm & Haas, and "SN THICKENER 612", "SN THICKENER 621N", "SN THICKENER 625N", "SN THICKENER 627N" and "SN THICKENER 660T" (all trade names) by San Nopco, Ltd.

The thickening agent is preferably a polyacrylic acid-based thickening agent and/or associative thickening agent, with associative thickening agents being more preferred, and urethane associative thickening agents having hydrophobic groups on the ends and containing urethane bonds in the molecular chain being even more preferred. The aforementioned urethane associative thickening agents are commercially available, and examples include "UH-420", "UH-462", "UH-472", "UH-540", "UH-752", "UH-756 VF" and "UH-814N" (all trade names) by Adeka Corp. and "SN THICKENER 612", "SN THICKENER 621N", "SN THICKENER 625N", "SN THICKENER 627N" and "SN THICKENER 660T" (all trade names) by San Nopco, Ltd.

For an embodiment in which the aqueous coating composition contains the aforementioned thickening agent, the aqueous coating composition contains the thickening agent in a range of preferably about 0.01 to about 15 parts by mass, more preferably about 0.05 to about 10 parts by mass and even more preferably about 0.1 to about 5 parts by mass, based on 100 parts by mass as the total solid content of the hydroxyl-containing resin (A) and the block polyisocyanate compound (B).

The aqueous coating composition may be prepared by mixing and dispersing the hydroxyl-containing resin (A) and the block polyisocyanate compound (B), and optionally a pigment, hydrophobic solvent and other paint additives, in an aqueous medium, by a common method. Also, the aqueous medium may be deionized water or a mixture of deionized water and a hydrophilic organic solvent. Examples of hydrophilic organic solvents include ethylene glycol monobutyl ether and propyleneglycol monomethyl ether.

The aqueous coating composition has a solid concentration in the range of preferably about 30 to about 80 mass %, more preferably about 40 to about 70 mass % and even more preferably about 45 to about 60 mass %.

As used herein, the "solid content" of the coating material, resin and other components refers to the non-volatile components remaining after drying at 110° C. for 1 hour. For example, the solid content of the coating material is the non-volatile components of the base resin, curing agent, pigment, etc. remaining in the coating material after drying at 110° C. for 1 hour. Thus, the solid concentration of the coating material can be calculated by measuring the uncured coating material in a heat-proof container such as an aluminum foil cup, spreading the coating material on the bottom of the container and then drying at 110° C. for 1 hour, and measuring the mass of the coating material components remaining after drying to determine the ratio of the mass of the coating material components remaining after drying with respect to the total mass of the coating material before drying.

The reason that a coating film with excellent adhesion can be formed even when the aqueous coating composition is coated after storage is conjectured to be that the block polyisocyanate compound (B) in the aqueous coating composition has hydrophilic groups and can therefore disperse relatively stably in water, and because it has hydrocarbon groups with a branched structure, the block isocyanate groups are converted to low polarity and are thus resistant to hydrolysis. Also, the reason that the aqueous coating composition can form a coating film with excellent smoothness and sharpness is conjectured to be that the hydrophilic groups of the block polyisocyanate compound (B) allow it to exist relatively homogeneously in the aqueous coating composition.

[Coating Film-Forming Method]

The aqueous coating composition can be coated onto various types of articles to be coated, allowing formation of coating films with excellent adhesion, smoothness, sharpness and water resistance. Since the aqueous coating composition of the invention can form a multilayer coating film with excellent adhesion, smoothness, sharpness and water resistance, it is preferably used as an aqueous coating material for a lower layer coating film in a multilayer coating film-forming method wherein aqueous coating materials are recoated.

[Article to be Coated]

There are no particular restrictions on articles to be coated by application of the aqueous coating composition, and examples include external platings of automobile bodies of passenger vehicles, trucks, motorcycles and buses; automobile parts; and external platings of consumer electric products such as cellular phones or audio devices, among which external platings of automobile bodies and automobile parts being preferred.

The material of an article to be coated is not particularly restricted, and examples include metal materials such as iron, aluminum, brass, copper, tin, stainless steel, galvanized steel and alloyed zinc (such as Zn—Al, Zn—Ni and Zn—Fe)-plated steel and the like; resins such as polyethylene resins, polypropylene resins, acrylonitrile-butadiene-styrene (ABS) resins, polyamide resins, acrylic resins, vinylidene chloride resins, polycarbonate resins, polyurethane resins and epoxy resins, plastic materials such as various FRP materials; inorganic materials such as glass, cement and concrete; wood materials; fiber materials such as paper and fabrics, and the like, among which metal materials and plastic materials are preferred.

The article to be coated may be an article that is a metal material or has a metal surface such as a car body formed thereof, and that has been surface-treated by phosphate treatment, chromate treatment or complex oxide treatment, or that has a coating film.

Articles to be coated having coating films include base materials that have been optionally surface treated, and having undercoat coating films formed thereover. Car bodies having undercoat coating films formed by electrodeposition coating are particularly preferred, and car bodies having undercoat coating films formed by cationic electrodeposition coating are more preferred.

The article to be coated may also be one that has been optionally surface treated or primer-coated on a plastic surface such as a plastic material or an automobile part formed from it. It may also be a combination of a plastic material and a metal material.

[Coating Method]

There are no particular restrictions on the method of coating the aqueous coating composition, and examples include air spray coating, airless spray coating, rotary atomizing coating, curtain coating and the like, with air spray coating and rotary atomizing coating being preferred. If desired, an electrostatic charge may be applied during the coating. The coating method can form a wet coating film from the aqueous coating composition.

The aqueous coating composition is coated to a cured film thickness in the range of preferably about 5 to about 70 μm, more preferably about 10 to about 50 μm and even more preferably about 15 to about 40 μm.

The wet coating film can be cured by heating. The curing may be accomplished by known heating means, for example, a drying furnace such as an air heating furnace, electric furnace or infrared induction heating furnace. The wet coating film can be cured by heating at a temperature in the range of preferably about 80 to about 180° C., more preferably about 100 to about 170° C. and even more preferably about 120 to about 160° C., for preferably about 10 to about 60 minutes and more preferably about 15 to about 40 minutes.

From the viewpoint of preventing coating defects such as popped pinholes from forming before the wet coating film cures by heating, the wet coating film may be preheated or air blown under conditions that substantially do not cure the coating film. The preheating is carried out by heating at a temperature in a range of preferably about 40 to about 100° C., more preferably about 50 to about 90° C. and even more preferably about 60 to about 80° C., preferably for about 30 seconds to about 15 minutes, more preferably about 1 minute to about 10 minutes and even more preferably about 2 minutes to about 5 minutes. Air blowing may be carried out by blasting the coated surface of the article to be coated with heated air at a temperature of usually ordinary temperature or about 25 to about 80° C., for a period of about 30 seconds to about 15 minutes.

Also, the aqueous coating composition may be used as an intermediate coating to form an intercoating film in a coating system that is to form a multilayer coating film comprising an intercoating film, a base coat and a clear coat on an article to be coated such as an automobile body, by a 3-coat, 1-bake system. The coating system may be employed according to method I below.

[Method I]

A multilayer coating film-forming method comprising:

(1) a step of coating an article to be coated with the aqueous coating composition to form an uncured intercoating film on the article to be coated, (2) a step of coating the article to be coated that has the uncured intercoating film, with an aqueous base coat coating composition, to form an uncured base coat thereover, (3) a step of coating the article to be coated that has the uncured intercoating film and the uncured base coat coating film, with a clear coating composition, to form an uncured clear coat thereover, and (4) a step of heating the uncured intercoating film, the uncured base coat and the uncured clear coat to cure them.

The article to be coated in Method I may be an automobile body having an undercoat coating film formed by cationic electrodeposition coating.

In Method I, the aqueous coating composition is coated to a cured film thickness in the range of preferably about 5 to about 60 μm, more preferably about 10 to about 50 μm and even more preferably about 15 to about 40 μm. Also, the aqueous base coat coating composition is coated to a cured film thickness in the range of preferably about 5 to about 30 μm, more preferably about 8 to about 25 μm and even more preferably about 10 to about 20 μm. The clear coating composition is coated to a cured film thickness in the range of preferably about 10 to about 80 μm, more preferably about 15 to about 60 μm and even more preferably about 20 to about 50 μm.

In Method I, the intercoating film may be preheated or air-blown under heating conditions in which the intercoating film substantially does not cure, from the viewpoint of preventing coating defects such as popped pinholes, after the uncured intercoating film of the aqueous coating composition has been formed on the article to be coated. The preheating is carried out by heating at a temperature in a range of preferably about 40 to about 100° C., more preferably about 50 to about 90° C. and even more preferably about 60 to about 80° C., preferably for about 30 seconds to about 15 minutes, more preferably about 1 minute to about 10 minutes and even more preferably about 2 minutes to about 5 minutes. Air blowing may be carried out by blasting the coated surface of the article to be coated with heated air at a temperature of usually ordinary temperature or about 25 to about 80° C., for a period of about 30 seconds to about 15 minutes.

Also, the preheating, air blowing and the like are preferably carried out after application of the aqueous base coat coating composition.

After the clear coating composition has been applied and before heating, it may be optionally left for an interval of about 1 to about 60 minutes at room temperature, or preheated at a temperature of about 40 to about 80° C. for about 1 to about 60 minutes.

The curing of the three-layer coating film comprising the uncured intercoating film, the uncured base coat and the uncured clear coat may be carried out using the heating means described above. The curing can be carried out by heating the three-layer coating film at a temperature in the range of preferably about 80 to about 180° C., more preferably about 100 to about 170° C. and even more preferably about 120 to about 160° C., for preferably about 10 to about 60 minutes and more preferably about 15 to about 40 minutes. The heating can cure the three-layer coating film by comprising the intercoating film, base coat and clear coat.

The aqueous base coat coating composition to be used in Method I may be a thermosetting aqueous base coat coating composition known for coating of automobile bodies, for example, a coating material having a base resin component such as an acrylic resin, polyester resin, alkyd resin, urethane resin or epoxy resin having crosslinkable functional groups such as carboxyl and hydroxyl, and a resin component composed of a curing agent such as a polyisocyanate compound, melamine resin or urea resin that is optionally blocked, dissolved or dispersed in water together with a pigment and other additives. The aqueous base coat coating composition is preferably a thermosetting aqueous coating material containing a hydroxyl-containing acrylic resin ($A_1$) and/or hydroxyl-containing polyester resin ($A_2$) as base resins and a melamine resin as a curing agent.

Also, the pigment may be any of the aforementioned color pigments, extender pigments and brightness pigments, with brightness pigments being preferred.

Examples of brightness pigments include aluminum (including vapor deposited aluminum), copper, zinc, brass, nickel, aluminum oxide, mica, aluminum oxide covered by titanium oxide or iron oxide, mica covered by titanium oxide or iron oxide, glass flakes, hologram pigments and the like, which were listed above in explaining the aqueous coating composition. Preferred among these are aluminum, aluminum oxide, mica, aluminum oxide covered by titanium oxide and/or iron oxide, mica covered by titanium oxide and/or iron oxide, and any desired combinations of the foregoing, with aluminum being especially preferred.

Also, the brightness pigment is preferably scaly. Preferred as brightness pigments are those having lengthwise dimensions in the range of about 1 to about 100 μm and more preferably about 5 to about 40 μm, and thicknesses in the range of about 0.001 to about 5 μm and more preferably about 0.01 to about 2 μm.

When the aqueous base coat coating composition contains such a brightness pigment, the aqueous base coat coating composition contains the brightness pigment in the range of preferably about 1 to about 50 parts by mass, more preferably about 2 to about 30 parts by mass and even more preferably about 3 to about 20 parts by mass, based on 100 parts by mass as the resin solid content.

The aqueous base coat coating composition also preferably contains the hydrophobic solvent mentioned above. From the viewpoint of improving the sheen quality of the coating film that is to be obtained, the hydrophobic solvent is preferably an alcohol-based hydrophobic solvent, and more preferably an approximately C7-C14 alcohol-based hydrophobic solvent, such as at least one alcohol-based hydrophobic solvent selected from the group consisting of 1-octanol, 2-octanol, 2-ethyl-1-hexanol, ethyleneglycol mono-2-ethylhexyl ether, propyleneglycol mono-n-butyl ether and dipropyleneglycol mono-n-butyl ether.

When the aqueous base coat coating composition contains such a hydrophobic solvent, the aqueous base coat coating composition contains the hydrophobic solvent in the range of preferably about 2 to about 70 parts by mass, more preferably about 11 to about 60 parts by mass and even more preferably about 16 to about 50 parts by mass, based on 100 parts by mass as the resin solid content.

Also, the aqueous base coat coating composition may further contain, optionally, common paint additives such as curing catalysts, thickening agents, ultraviolet absorbers, light stabilizers, antifoaming agents, plasticizers, organic solvents, surface control agents, anti-settling agents and the like, as well as any desired combinations of the foregoing.

A clear coating composition to be used in Method I may be a thermosetting clear coating composition known for coating of automobile bodies and the like, examples of which include organic solvent-type thermosetting coating compositions containing a base resin with a crosslinkable functional group, and a crosslinking agent, aqueous thermosetting coating compositions, and powder thermosetting coating compositions.

Examples of crosslinkable functional groups in the base resin include carboxyl, hydroxyl, epoxy and silanol groups. Examples of types for the base resin include acrylic resins, polyester resins, alkyd resins, urethane resins, epoxy resins and fluorine resins. Examples for the crosslinking agent include polyisocyanate compounds, blocked polyisocyanate compounds, melamine resins, urea resins, carboxyl group-containing compounds, carboxyl group-containing resins, epoxy group-containing resins and epoxy group-containing compounds.

Preferred examples of base resin/crosslinking agent combinations for the clear coating composition include carboxyl group-containing resin/epoxy group-containing resins, hydroxyl-containing resin/polyisocyanate compounds, hydroxyl-containing resin/blocked polyisocyanate compounds and hydroxyl-containing resin/melamine resin combinations.

The clear coating composition may be a one-pack type coating material, or a multi-pack type coating material such as a two-pack urethane resin coating material.

Also, the clear coating composition may contain, optionally, color pigments, brightness pigments, dyes and the like in ranges that do not impair the transparency, and may further contain extender pigments, ultraviolet absorbers, light stabilizers, antifoaming agents, thickening agents, rust-preventive agents, surface control agents and the like.

The aqueous coating composition may be used as an intermediate coating to form an intercoating film in a coating system that is to form a multilayer coating film comprising an intercoating film and a top coating film on an article to be coated such as an automobile body, by a 2-coat, 1-bake system. The coating system may be employed according to method II below.

[Method II]

A coating film-forming method comprising:

(1) a step of coating an article to be coated with the aqueous coating composition to form an uncured intercoating film on the article to be coated, (2) a step of coating the article to be coated that has the uncured intercoating film, with an aqueous top coating composition, to form an uncured top coating film thereover, (3) a step of heating the uncured intercoating film and uncured top coating film, to cure them.

The article to be coated in Method II is preferably an automobile body having an undercoat coating film formed by cationic electrodeposition coating. As used herein, a "cured coating film" is a coating film in a cured dry state as specified by JIS K 5600-1-1, i.e. a state in which, when the center of the coating surface is firmly held between the thumb and the forefinger, no fingerprint indentation is formed on the coating surface, no movement of the coating film is felt, and no rubbing trace remains on the coating surface when the center of the coating surface is rapidly rubbed with the fingertips. On the other hand, an "uncured coating film" is a state in which the coating film has not reached the cured dry state, and this also includes a tack free state and semi-cured dry state as specified by JIS K 5600-1-1.

In Method II, the aqueous coating composition is coated to a cured film thickness in the range of preferably about 5 to about 60 μm, more preferably about 10 to about 50 μm and even more preferably about 15 to about 40 μm. Also, the aqueous top coating composition is coated to a cured film thickness in the range of preferably about 10 to about 80 μm, more preferably about 15 to about 60 μm and even more preferably about 20 to about 50 μm.

In Method II, the intercoating film may be preheated or air-blown under heating conditions in which the intercoating film substantially does not cure, from the viewpoint of preventing coating defects such as popped pinholes, after the uncured intercoating film of the aqueous coating composition has been formed on the article to be coated. The preheating is carried out by heating at a temperature in a range of preferably about 40 to about 100° C., more preferably about 50 to about 90° C. and even more preferably about 60 to about 80° C., preferably for about 30 seconds to about 15 minutes, more preferably about 1 to about 10 minutes and even more preferably about 2 to about 5 minutes. Air blowing may be carried out by blasting the coated surface of the article to be coated with heated air at a temperature of usually ordinary temperature or about 25 to about 80° C., for a period of about 30 seconds to about 15 minutes. Also, the preheating and air blowing are preferably carried out under heating conditions in which the coating film substantially does not cure, even after the application of the aqueous top coating composition.

The curing of both coating films including the uncured intercoating film and the uncured top coating film may be carried out using the heating means described above. The curing can be carried out by heating both coating films at temperature in the range of preferably about 80 to about 180° C., more preferably about 100 to about 170° C. and even more preferably about 120 to about 160° C., for preferably about 10 to about 60 minutes and more preferably about 15 to about 40 minutes. The heating can cure both coating films including the intercoating film and the top coating film.

The aqueous top coating composition to be used in Method II is generally for the purpose of imparting an excellent outer appearance to the article to be coated, and it may be a thermosetting aqueous top coating composition known for coating of automobile bodies, for example, a coating material having a base resin component such as an acrylic resin, polyester resin, alkyd resin, urethane resin or epoxy resin having crosslinkable functional groups such as carboxyl and hydroxyl, and a resin component composed of a curing agent such as a polyisocyanate compound, melamine resin or urea resin that is optionally blocked, dissolved or dispersed in water together with a pigment and other additives. The aqueous top coating composition is preferably a thermosetting aqueous coating material containing a hydroxyl-containing acrylic resin ($A_1$) and/or hydroxyl-containing polyester resin ($A_2$) as base resins and a melamine resin as a curing agent.

Also, the pigment may be any of the aforementioned color pigments, extender pigments and brightness pigments, with color pigments being preferred.

Examples for the color pigment include titanium oxide, zinc oxide, carbon black, molybdenum red, Prussian blue, cobalt blue, azo-based pigments, phthalocyanine-based pigments, quinacridone-based pigments, isoindoline-based pigments, threne-based pigments, perylene-based pigments, dioxazine-based pigments, diketopyrrolopyrrole-based pigments and the like, which were listed above in explaining the aqueous coating composition.

When the aqueous top coating composition contains such a color pigment, the aqueous top coating composition contains the color pigment in the range of preferably about 1 to about 120 parts by mass, more preferably about 3 to about 100 parts by mass and even more preferably about 5 to about 90 parts by mass, based on 100 parts by mass as the resin solid content.

Also, the aqueous top coating composition may further contain, optionally, common paint additives such as curing catalysts, thickening agents, ultraviolet absorbers, light stabilizers, antifoaming agents, plasticizers, organic solvents, surface control agents, anti-settling agents and the like, as well as any desired combinations of the foregoing.

In Methods I and II, the aqueous top coating composition, aqueous base coat coating composition and clear coating composition may be applied by known methods, such as air spray coating, airless spray coating or rotary atomizing coating.

EXAMPLES

The present invention will now be explained in greater detail using examples and comparative examples. However, it is to be understood that the invention is not limited only to these examples. The "parts" and "%" values are all based on mass. Also, the film thicknesses of the coating films are based on the cured coating films.

[Production of Block Polyisocyanate Compound]

Example 1

After charging 1610 parts of "SUMIDUR N-3300" (trade name of Sumika Bayer Urethane Co., Ltd., polyisocyanate containing isocyanurate structure derived from hexamethylene diisocyanate, solid content: approximately 100%, isocyanate group content: 21.8%), 275 parts of "UNIOX M-550" (product of NOF Corp., polyethyleneglycol monomethyl ether, average molecular weight: approximately 550) and 0.9 part of 2,6-di-tert-butyl-4-methylphenol into a reactor equipped with a thermometer, thermostat, stirrer, reflux condenser, nitrogen inlet tube, dropper and simple trap for the removed solvent, the contents were thoroughly mixed and heated under a nitrogen stream at 130° C. for 3 hours.

Next, 550 parts of ethyl acetate and 1150 parts of diisopropyl malonate were charged into the reactor and 14 parts of a 28% methanol solution of sodium methoxide was added to the reactor while stirring under a nitrogen stream, and stirring was continued at 65° C. for 8 hours. The isocyanate content in the obtained resin solution was approximately 0.1 mol/kg. After adding 3110 parts of 4-methyl-2-pentanol to the reactor, the solvent was distilled off over a period of 3 hours under reduced pressure conditions while maintaining a system temperature of 90° C. to 95° C., to obtain 4920 parts of a block polyisocyanate compound (BN-1) solution. The simple trap included 585 parts of isopropanol. The solid concentration of the block polyisocyanate compound (BN-1) solution was approximately 60%.

Example 2

A block polyisocyanate compound (BN-2) solution (4870 parts) was obtained according to Example 1, except that the 275 parts of "UNIOX M-550" was changed to 275 parts of "UNIOX M-400" (product of NOF Corp., polyethyleneglycol monomethyl ether, average molecular weight: approximately 400), the amount of diisopropyl malonate was changed to 1120 parts, and the amount of 4-methyl-2-pentanol was changed to 3040 parts. The simple trap included 570 parts of isopropanol. The solid concentration of the block polyisocyanate compound (BN-2) solution was approximately 60%. The amount of isocyanate in the resin solution before addition of the 4-methyl-2-pentanol was approximately 0.1 mol/kg.

Example 3

A block polyisocyanate compound (BN-3) solution (4930 parts) was obtained according to Example 1, except that in addition to the 275 parts of "UNIOX M-550" there was added 25 parts of "PEG#600" (product of NOF Corp., polyethylene glycol, average molecular weight: approximately 600), the amount of diisopropyl malonate was changed to 1140 parts, and the amount of 4-methyl-2-pentanol was changed to 3080 parts. The simple trap included 580 parts of isopropanol. The solid concentration of the block polyisocyanate compound (BN-3) solution was approximately 60%. The amount of isocyanate in the resin solution before addition of the 4-methyl-2-pentanol was approximately 0.1 mol/kg.

Example 4

A block polyisocyanate compound (BN-4) solution (4880 parts) was obtained according to Example 1, except that the 275 parts of "UNIOX M-550" was changed to 300 parts of polyethylene glycol with an average molecular weight of approximately 800 (propylene glycol) (the ethylene glycol structure/propylene glycol structure ratio being roughly 10/1 (molar ratio)), the amount of diisopropyl malonate was changed to 1110 parts, and the amount of 4-methyl-2-pentanol was changed to 3010 parts. The simple trap included 570 parts of isopropanol. The solid concentration of the block polyisocyanate compound (BN-4) solution was approximately 60%. The amount of isocyanate in the resin solution before addition of the 4-methyl-2-pentanol was approximately 0.1 mol/kg.

Example 5

After charging 1610 parts of "SUMIDUR N-3300" and 236 parts of hydroxypivalic acid into a reactor equipped with a thermometer, thermostat, stirrer, reflux condenser, nitrogen inlet tube, dropper and simple trap for the removed solvent, the contents were thoroughly mixed while stirring and heated at 130° C. for 3 hours under a nitrogen stream. Next, 550 parts of ethyl acetate and 930 parts of diisopropyl malonate were charged into the reactor and 14 parts of a 28% methanol solution of sodium methoxide was added to the reactor while stirring under a nitrogen stream, and stirring was continued at 65° C. for 8 hours.

The isocyanate content in the obtained resin solution was approximately 0.1 mol/kg. After adding 2530 parts of 4-methyl-2-pentanol to the reactor, the solvent was distilled off over a period of 3 hours under reduced pressure conditions while maintaining a system temperature of 90° C. to 95° C., to obtain 4450 parts of a block polyisocyanate compound (BN-5) solution. The simple trap included 475 parts of isopropanol. The solid concentration of the block polyisocyanate compound (BN-5) solution was approximately 60%.

Example 6

A block polyisocyanate compound (BN-6) solution (4540 parts) was obtained according to Example 5, except that the 236 parts of hydroxypivalic acid was changed to 177 parts of hydroxypivalic acid and 125 parts of "PLACCEL 205BA" (trade name of Daicel Chemical Industries, Ltd., ε-caprolactone-modified product of 2,2-dimethylolbutanoic acid). The simple trap included 475 parts of isopropanol. The solid concentration of the block polyisocyanate compound (BN-6) solution was approximately 60%. The amount of isocyanate in the resin solution before addition of the 4-methyl-2-pentanol was approximately 0.1 mol/kg.

Example 7

After charging 1510 parts of "DURANATE TPA-100" (trade name of Asahi Kasei Chemicals Corp., polyisocyanate containing isocyanurate structure derived from hexamethylene diisocyanate, solid content: approximately 100%, isocyanate group content: 23.0%), 275 parts of "UNIOX M-550" and 0.9 part of 2,6-di-tert-butyl-4-methylphenol into a reactor equipped with a thermometer, thermostat, stirrer, reflux condenser, nitrogen inlet tube, dropper and simple trap for the removed solvent, the contents were thoroughly mixed while stirring and heated under a nitrogen stream at 130° C. for 3 hours.

Next, 550 parts of ethyl acetate and 975 parts of diethyl malonate were charged into the reactor and 14 parts of a 28% methanol solution of sodium methoxide was added to the reactor while stirring under a nitrogen stream, and stirring was continued at 65° C. for 8 hours. The isocyanate content in the obtained resin solution was approximately 0.1 mol/kg. After adding 3110 parts of 4-methyl-2-pentanol to the reactor, the solvent was distilled off over a period of 3 hours under reduced pressure conditions while maintaining a system temperature of 80° C. to 85° C., to obtain 4530 parts of a block polyisocyanate compound (BN-7) solution. The simple trap included 340 parts of ethanol. The solid concentration of the block polyisocyanate compound (BN-7) solution was approximately 60%.

Example 8

A block polyisocyanate compound (BN-8) solution (4850 parts) was obtained according to Example 1, except that the 1150 parts of diisopropyl malonate was changed to 1030 parts of diisopropyl malonate and 85 parts of isopropyl acetoacetate, and the amount of 4-methyl-2-pentanol was changed to 2960 parts. The simple trap included 555 parts of isopropanol. The solid concentration of the block polyisocyanate compound (BN-8) solution was approximately 60%. The amount of isocyanate in the resin solution before addition of the 4-methyl-2-pentanol was approximately 0.1 mol/kg.

Example 9

A block polyisocyanate compound (BN-9) solution (4830 parts) was obtained according to Example 1, except that the 1150 parts of diisopropyl malonate was changed to 880 parts of diethyl malonate and 95 parts of ethyl isobutyrylacetate, and the amount of 4-methyl-2-pentanol was changed to 2960 parts. The simple trap included 425 parts of ethanol. The solid concentration of the block polyisocyanate compound (BN-9) solution was approximately 60%. The amount of isocyanate in the resin solution before addition of the 4-methyl-2-pentanol was approximately 0.1 mol/kg.

Example 10

A block polyisocyanate compound (BN-10) solution (5110 parts) was obtained according to Example 1, except that the 3110 parts of 4-methyl-2-pentanol was changed to 3540 parts of 5-methyl-2-hexanol. The simple trap included 585 parts of isopropanol. The solid concentration of the block polyisocyanate compound (BN-10) solution was approximately 60%. The amount of isocyanate in the resin solution before addition of the 5-methyl-2-hexanol was approximately 0.1 mol/kg.

Example 11

A block polyisocyanate compound (BN-11) solution (5310 parts) was obtained according to Example 1, except that the 3110 parts of 4-methyl-2-pentanol was changed to 3970 parts of 6-methyl-2-heptanol. The simple trap included 585 parts of isopropanol. The solid concentration of the block polyisocyanate compound (BN-11) solution was approximately 60%. The amount of isocyanate in the resin solution before addition of the 6-methyl-2-heptanol was approximately 0.1 mol/kg.

Comparative Example 1

After charging 1610 parts of "SUMIDUR N-3300", 275 parts of "UNIOX M-550" and 0.9 part of 2,6-di-tert-butyl-4-methylphenol into a reactor equipped with a thermometer, thermostat, stirrer, reflux condenser, nitrogen inlet tube, dropper and simple trap for the removed solvent, the contents were thoroughly mixed and heated at 130° C. for 3 hours under a nitrogen stream.

Next, 550 parts of ethyl acetate and 975 parts of diethyl malonate were charged into the reactor and 14 parts of a 28% methanol solution of sodium methoxide was added to the reactor while stirring under a nitrogen stream, and then stirring was continued at 65° C. for 8 hours. The isocyanate content in the obtained resin solution was approximately 0.1 mol/kg. After adding 2260 parts of n-butanol, the solvent was distilled off over a period of 3 hours under reduced pressure conditions while maintaining a system temperature of 90° C. to 95° C., to obtain 4380 parts of a block polyisocyanate compound (BN-12) solution. The simple trap included 335 parts of ethanol. The solid concentration of the block polyisocyanate compound (BN-12) solution was approximately 60%.

Comparative Example 2

A block polyisocyanate compound (BN-13) solution (4330 parts) was obtained according to Comparative Example 1, except that the 2260 parts of n-butanol was changed to 2260 parts of 2-butanol. The simple trap included 280 parts of ethanol. The solid concentration of the block polyisocyanate compound (BN-13) solution was approximately 60%. The amount of isocyanate in the resin solution before addition of the 2-butanol was approximately 0.1 mol/kg.

Comparative Example 3

A block polyisocyanate compound (BN-14) solution (5260 parts) was obtained according to Comparative Example 1, except that the 2260 parts of n-butanol was changed to 3970 parts of 2-ethylhexanol. The simple trap included 450 parts of ethanol. The solid concentration of the block polyisocyanate compound (BN-14) solution was approximately 60%. The amount of isocyanate in the resin solution before addition of the 2-ethylhexanol was approximately 0.1 mol/kg.

Comparative Example 4

A block polyisocyanate compound (BN-15) solution (5090 parts) was obtained according to Comparative Example 1, except that the 2260 parts of n-butanol was changed to 3600 parts of propyleneglycol monopropyl ether. The simple trap included 445 parts of ethanol. The solid concentration of the block polyisocyanate compound (BN-15) solution was approximately 60%. The amount of isocyanate in the resin solution before addition of the propyleneglycol monopropyl ether approximately 0.1 mol/kg.

Production of Hydroxyl-Containing Acrylic Resin ($A_1$)

Production Example 1

After charging 120 parts of deionized water and 0.8 part of "ADEKA REASOAP SR-1025" (trade name of Adeka Corp., emulsifying agent, active ingredient: 25%) into a reactor equipped with a thermometer, thermostat, stirrer, reflux condenser, nitrogen inlet tube and dropper, the mixture was stirred in a nitrogen stream and heated to 80° C.

Next, 5% of the total core section monomer emulsion described below and 2.5 parts of a 6% ammonium persulfate aqueous solution were introduced into the reactor, and the mixture was kept at 80° C. for 15 minutes. The remainder of the core section monomer emulsion was then added dropwise into the reactor kept at the same temperature over a period of 3 hours, and upon completion of the dropwise addition the mixture was aged for 1 hour. Next, the shell section monomer emulsion was added dropwise over a period of 1 hour and aged for 1 hour, and the mixture was then cooled to 30° C. while gradually adding 3.8 parts of a 5% 2-(dimethylamino)ethanol aqueous solution to the reactor, and subsequently discharged while filtering with a 100 mesh nylon cloth, to obtain a water-dispersible hydroxyl-containing acrylic resin ($A_1$-1) aqueous dispersion with a mean particle size of 100 nm and a solid content of 30%. The water-dispersible hydroxyl-containing acrylic resin ($A_1$-1) had an acid value of 24 mgKOH/g and a hydroxyl value of 11 mgKOH/g.

Core Section Monomer Emulsion:

A core section monomer emulsion was obtained by stirred mixing of 54 parts of deionized water, 3.1 parts of "ADEKA REASOAP SR-1025", 2.3 parts of allyl methacrylate, 12.3 parts of styrene, 31.2 parts of n-butyl acrylate and 31.2 parts of methyl methacrylate.

Shell Section Monomer Emulsion:

A shell section monomer emulsion was obtained by stirred mixing of 50 parts of deionized water, 1.8 parts of "ADEKA REASOAP SR-1025", 0.04 parts of ammonium persulfate, 2.3 parts of 2-hydroxyethyl acrylate, 3.7 parts of methacrylic acid, 3.7 parts of styrene, 9.2 parts of n-butyl acrylate and 4 parts of methyl methacrylate.

Production Examples 2 to 6

Aqueous dispersions of water-dispersible hydroxyl-containing acrylic resins ($A_1$-2) to ($A_1$-6) were obtained by the same procedure as Production Example 1, except for using the amounts listed in Table 1 below.

Table 1 shows the starting compositions (parts), solid concentrations (%), acid values (mgKOH/g) and hydroxyl values (mgKOH/g) of the water-dispersible hydroxyl-containing acrylic resin aqueous dispersions ($A_1$-1) to ($A_1$-6)

upon completion of the dropwise addition it was aged for 1 hour, after which the mixture was cooled to 30° C. while gradually adding 3.8 parts of a 5% 2-(dimethylamino) ethanol aqueous solution to the reactor, and discharged while filtering with a 100 mesh nylon cloth, to obtain a water-dispersible hydroxyl-containing acrylic resin ($A_1$-7) aqueous dispersion with a mean particle size of 100 nm and a solid content of 30%. The water-dispersible hydroxyl-containing acrylic resin ($A_1$-7) had an acid value of 24 mgKOH/g and a hydroxyl value of 11 mgKOH/g.

Monomer Emulsion (1):

A monomer emulsion (1) was obtained by stirred mixing of 104 parts of deionized water, 4.9 parts of "ADEKA REASOAP SR-1025", 0.04 parts of ammonium persulfate, 2.3 parts of allyl methacrylate, 16.0 parts of styrene, 37.8

TABLE 1

| Production Example | | | 1 | 2 | 3 | 4 | 5 | 6 |
|---|---|---|---|---|---|---|---|---|
| Water-dispersible hydroxyl-containing acrylic resin ($A_1$) No. | | | $A_1$-1 | $A_1$-2 | $A_1$-3 | $A_1$-4 | $A_1$-5 | $A_1$-6 |
| Deionized water | | | 120 | 120 | 120 | 120 | 120 | 120 |
| ADEKA REASOAP SR-1025 | | | 0.8 | 0.8 | 0.8 | 0.8 | 0.8 | 0.8 |
| 6% Ammonium persulfate aqueous solution | | | 2.5 | 2.5 | 2.5 | 2.5 | 2.5 | 2.5 |
| Core section monomer emulsion | Deionized water | | 54 | 54 | 54 | 54 | 54 | 54 |
| | ADEKA REASOAP SR-1025 | | 3.1 | 3.1 | 3.1 | 3.1 | 3.1 | 3.1 |
| | Monomer ($I_1$) | Allyl methacrylate | 2.3 | 2.3 | 2.3 | 2.3 | 2.3 | 2.3 |
| | Monomer ($I_2$) Hydrophobic polymerizable unsaturated monomer | Styrene | 12.3 | 12.3 | 12.3 | 12.3 | 12.3 | — |
| | | n-Butyl acrylate | 31.2 | 31.2 | 31.2 | 31.2 | 31.2 | — |
| | | Methyl acrylate | 31.2 | 31.2 | 31.2 | 31.2 | 31.2 | 31.2 |
| | | Ethyl acrylate | — | — | — | — | — | 43.5 |
| Shell section monomer emulsion | Deionized water | | 50 | 50 | 50 | 50 | 50 | 50 |
| | ADEKA REASOAP SR-1025 | | 1.8 | 1.8 | 1.8 | 1.8 | 1.8 | 1.8 |
| | Ammonium persulfate | | 0.04 | 0.04 | 0.04 | 0.04 | 0.04 | 0.04 |
| | Hydroxyl-containing polymerizable unsaturated monomer ($II_1$) | 2-Hydroxyethyl acrylate | 2.3 | 2.3 | 2.3 | 2.3 | 2.3 | 2.3 |
| | Carboxyl-containing polymerizable unsaturated monomer ($II_2$) | Methacrylic acid | 3.7 | 8.2 | 4.5 | 1.6 | 0.1 | 3.7 |
| | Other polymerizable unsaturated monomers ($II_3$) | Styrene | 3.7 | 3.7 | 3.7 | 3.7 | 3.7 | — |
| | | n-Butyl acrylate | 9.2 | 4.7 | 9.2 | 9.2 | 9.2 | — |
| | | Methyl methacrylate | 4 | 4 | 3.2 | 6.1 | 7.7 | 4 |
| | | Ethyl acrylate | — | — | — | — | — | 12.9 |
| 5% 2-(Dimethylamino)ethanol aqueous solution | | | 3.8 | 3.8 | 3.8 | 3.8 | 3.8 | 3.8 |
| Solid concentration [%] | | | 30 | 30 | 30 | 30 | 30 | 30 |
| Acid value [mgKOH/g] | | | 24 | — | 29 | 10 | 0.65 | 24 |
| Hydroxyl value [mgKOH/g] | | | 11 | 11 | 11 | 11 | 11 | 11 |

The water-dispersible hydroxyl-containing acrylic resins ($A_1$-1) to ($A_1$-6) correspond to the core-shell type water-dispersible hydroxyl-containing acrylic resin ($A_{111}$)

Production Example 7

After charging 120 parts of deionized water and 0.8 part of "ADEKA REASOAP SR-1025" (trade name of Adeka Corp., emulsifying agent, active ingredient: 25%) into a reactor equipped with a thermometer, thermostat, stirrer, reflux condenser, nitrogen inlet tube and dropper, the mixture was stirred in a nitrogen stream and heated to 80° C.

Next, 5% of the total monomer emulsion (1) described below and 2.5 parts of a 6% ammonium persulfate aqueous solution were introduced into the reactor, and the mixture was kept at 80° C. for 15 minutes. Next, the remainder of the monomer emulsion (1) was added dropwise into the reactor kept at the same temperature over a period of 3 hours, and parts of n-butyl acrylate, 37.9 parts of methyl methacrylate, 2.3 parts of 2-hydroxyethyl acrylate and 3.7 parts of methacrylic acid.

The water-dispersible hydroxyl-containing acrylic resin ($A_1$-7) corresponds to the core-shell type water-dispersible hydroxyl-containing acrylic resin ($A_1$).

Production of Hydroxyl-Containing Polyester Resin ($A_2$)

Production Example 8

After charging 109 parts of trimethylolpropane, 141 parts of 1,6-hexanediol, 126 parts of 1,2-cyclohexanedicarboxylic anhydride and 120 parts of adipic acid into a reactor equipped with a thermometer, thermostat, stirrer, reflux condenser and water separator, and heating from 160° C. to 230° C. for a period of 3 hours, condensation reaction was conducted at 230° C. for 4 hours while distilling off the produced condensation water with a water separator.

Next, 38.3 parts of trimellitic anhydride was further added for addition of carboxyl groups to the obtained condensation reaction product, reaction was conducted at 170° C. for 30 minutes, and then dilution was performed with ethyleneglycol monobutyl ether to obtain a hydroxyl-containing polyester resin ($A_2$-1) solution with a solid concentration of 70%. The hydroxyl-containing polyester resin ($A_2$-1) had an acid value of 46 mgKOH/g, a hydroxyl value of 150 mgKOH/g and a number-average molecular weight of 1,400. The total content of alicyclic polybasic acid among the acid components of the starting composition was 46 mol % based on the total acid components.

[Production of Pigment Dispersion]

Production Example 9

After placing 14.3 parts of the hydroxyl-containing polyester resin solution ($A_2$-1) obtained in Production Example 8 (solid content: 10 parts), 50 parts of "JR-806" (trade name of Tayca Corp., rutile titanium dioxide) and 30 parts of deionized water in a container equipped with a stirrer, the contents were thoroughly mixed and 2-(dimethylamino)ethanol was added to the mixed solution for adjustment to pH 8.0. Next, the obtained mixed solution was placed in a wide-mouth glass bottle, glass beads with diameters of about 1.3 mm$\phi$ were added as a dispersion medium, the bottle was sealed, and the mixture was dispersed for 4 hours with a paint shaker to obtain pigment dispersion (P-1).

Production Example 10

After placing 14.3 parts of hydroxyl-containing polyester resin solution ($A_2$-1) obtained in Production Example 8 (solid content: 10 parts), 25 parts of "BARIFINE BF-1" (trade name of Sakai Chemical Industry Co., Ltd., barium sulfate powder) and 36 parts of deionized water in a container equipped with a stirrer, the contents were thoroughly mixed and 2-(dimethylamino)ethanol was added to the mixed solution for adjustment to pH 8.0. Next, the obtained mixed solution was placed in a wide-mouth glass bottle, glass beads with diameters of about 1.3 mm$\phi$ were added as a dispersion medium, the bottle was sealed, and the mixture was dispersed for 4 hours with a paint shaker to obtain pigment dispersion (P-2).

Production Example 11

After placing 14.3 parts of hydroxyl-containing polyester resin solution ($A_2$-1) obtained in Production Example 8 (solid content: 10 parts), 10 parts of "MITSUBISHI CARBON BLACK MA-100" (trade name of Mitsubishi Chemical Corp., carbon black) and 50 parts of deionized water in a container equipped with a stirrer, the contents were thoroughly mixed and 2-(dimethylamino)ethanol was added to the mixed solution for adjustment to pH 8.0. Next, the obtained mixed solution was placed in a wide-mouth glass bottle, glass beads with diameters of about 1.3 mm$\phi$ were added as a dispersion medium, the bottle was sealed, and the mixture was dispersed for 4 hours with a paint shaker to obtain pigment dispersion (P-3).

Production of Aqueous Coating Composition

Example 12

After thoroughly mixing 90 parts of an aqueous dispersion of the water-dispersible hydroxyl-containing acrylic resin ($A_1$-4) obtained in Production Example 4 (solid content: 27 parts), 26 parts of the hydroxyl-containing polyester resin ($A_2$-1) solution obtained in Production Example 8 (solid content: 18 parts), 35 parts of the block polyisocyanate compound (BN-1) solution obtained in Example 1 (solid content: 21 parts), 16 parts of "SAIMEL 325" (trade name of Nihon Cytec Industries Inc., melamine resin, solid content: 80%) (solid content: 13 parts), 114 parts of pigment dispersion (P-1) obtained in Production Example 9, 60 parts of pigment dispersion (P-2) obtained in Production Example 10 and 7.5 parts of pigment dispersion (P-3) obtained in Production Example 11, "ACRYSOL ASE-60" (trade name of Rohm & Haas, polyacrylic acid-based thickening agent), 2-(dimethylamino)ethanol and deionized water were added to the mixture to obtain an aqueous coating composition (X-1) having pH 8.0, a solid concentration of 45%, and a viscosity of 40 seconds with a No. 4 Ford cup at 20° C.

Examples 13 to 28 and Comparative Examples 5 to 8

Aqueous coating compositions (X-2) to (X-21) were obtained in the same manner as Example 12, except that the contents were changed as shown in Table 2 below.

TABLE 2

| | | | Example | | | | | | | | | | |
|---|---|---|---|---|---|---|---|---|---|---|---|---|---|
| | | | 12 | 13 | 14 | 15 | 16 | 17 | 18 | 19 | 20 | 21 | 22 |
| Aqueous coating composition name | | | X-1 | X-2 | X-3 | X-4 | X-5 | X-6 | X-7 | X-8 | X-9 | X-10 | X-11 |
| Hydroxyl-containing resin (A) | Hydroxyl-containing acrylic resin ($A_1$) | Type | $A_1$-4 | $A_1$-4 | $A_1$-4 | $A_1$-4 | $A_1$-4 | $A_1$-4 | $A_1$-4 | $A_1$-4 | $A_1$-4 | $A_1$-4 | $A_1$-4 |
| | | Amount | 90 | 90 | 90 | 90 | 90 | 90 | 90 | 90 | 90 | 90 | 90 |
| | Hydroxyl-containing polyester resin ($A_2$) | Type | $A_2$-1 | $A_2$-1 | $A_2$-1 | $A_2$-1 | $A_2$-1 | $A_2$-1 | $A_2$-1 | $A_2$-1 | $A_2$-1 | $A_2$-1 | $A_2$-1 |
| | | Amount | 26 | 26 | 26 | 26 | 26 | 26 | 26 | 26 | 26 | 26 | 26 |
| Block polyisocyanate compound | Type | | BN-1 | BN-2 | BN-3 | BN-4 | BN-5 | BN-6 | BN-7 | BN-8 | BN-9 | BN-10 | BN-11 |
| | Amount | | 35 | 35 | 35 | 35 | 35 | 35 | 35 | 35 | 35 | 35 | 35 |
| Melamine resin | SAIMEL 325 | | 16 | 16 | 16 | 16 | 16 | 16 | 16 | 16 | 16 | 16 | 16 |
| Pigment dispersion | P-1 | | 114 | 114 | 114 | 114 | 114 | 114 | 114 | 114 | 114 | 114 | 114 |
| | P-2 | | 60 | 60 | 60 | 60 | 60 | 60 | 60 | 60 | 60 | 60 | 60 |
| | P-3 | | 7.5 | 7.5 | 7.5 | 7.5 | 7.5 | 7.5 | 7.5 | 7.5 | 7.5 | 7.5 | 7.5 |

TABLE 2-continued

| | | | Example | | | | | | Comparative Example | | | |
|---|---|---|---|---|---|---|---|---|---|---|---|---|
| | | | 23 | 24 | 25 | 26 | 27 | 28 | 5 | 6 | 7 | 8 |
| Aqueous coating composition name | | | X-12 | X-13 | X-14 | X-15 | X-16 | X-17 | X-18 | X-19 | X-20 | X-21 |
| Hydroxyl-containing resin (A) | Hydroxyl-containing acrylic resin ($A_1$) | Type | $A_1$-1 | $A_1$-2 | $A_1$-3 | $A_1$-5 | $A_1$-6 | $A_1$-7 | $A_1$-4 | $A_1$-4 | $A_1$-4 | $A_1$-4 |
| | | Amount | 90 | 90 | 90 | 90 | 90 | 90 | 90 | 90 | 90 | 90 |
| | Hydroxyl-containing polyester resin ($A_2$) | Type | $A_2$-1 | $A_2$-1 | $A_2$-1 | $A_2$-1 | $A_2$-1 | $A_2$-1 | $A_2$-1 | $A_2$-1 | $A_2$-1 | $A_2$-1 |
| | | Amount | 26 | 26 | 26 | 26 | 26 | 26 | 26 | 26 | 26 | 26 |
| Block polyisocyanate compound | Type | | BN-1 | BN-1 | BN-1 | BN-1 | BN-1 | BN-1 | BN-12 | BN-13 | BN-14 | BN-15 |
| | Amount | | 35 | 35 | 35 | 35 | 35 | 35 | 35 | 35 | 35 | 35 |
| Melamine resin | SAIMEL 325 | | 16 | 16 | 16 | 16 | 16 | 16 | 16 | 16 | 16 | 16 |
| Pigment dispersion | P-1 | | 114 | 114 | 114 | 114 | 114 | 114 | 114 | 114 | 114 | 114 |
| | P-2 | | 60 | 60 | 60 | 60 | 60 | 60 | 60 | 60 | 60 | 60 |
| | P-3 | | 7.5 | 7.5 | 7.5 | 7.5 | 7.5 | 7.5 | 7.5 | 7.5 | 7.5 | 7.5 |

Production of Water-Dispersible Hydroxyl-Containing Acrylic Resin Aqueous Dispersions for Aqueous Top Coating Composition and Aqueous Base Coat Coating Composition Production Example 12

After charging 130 parts of deionized water and 0.52 part of AQUALON KH-10 into a reactor equipped with a thermometer, thermostat, stirrer, reflux condenser, nitrogen inlet tube and dropper, the mixture was stirred in a nitrogen airflow and the temperature was increased to 80° C. Next, 1% of the total monomer emulsion (2) described below and 5.3 parts of a 6% ammonium persulfate aqueous solution were packed into the reactor, and the mixture was kept at 80° C. for 15 minutes. The remainder of the monomer emulsion (2) was then added dropwise into the reactor kept at the same temperature over a period of 3 hours, and upon completion of the dropwise addition the mixture was aged for 1 hour.

Next, the monomer emulsion (3) described below was added dropwise over a period of 1 hour and aged for 1 hour, and then cooled to 30° C. while gradually adding 40 parts of a 5% dimethylethanolamine aqueous solution to the reactor and discharged while filtering with a 100 mesh nylon cloth, to obtain an aqueous dispersion of a water-dispersible hydroxyl-containing acrylic resin (AC) having a mean particle size of 100 nm (measured at 20° C. using a "COULTER N4" submicron particle size distribution analyzer (product of Beckman Coulter, Inc.) after dilution with deionized water) and a solid concentration of 30%. The water-dispersible hydroxyl-containing acrylic resin (AC) had an acid value of 33 mgKOH/g and a hydroxyl value of 25 mgKOH/g.

Monomer Emulsion (2):

Monomer emulsion (2) was obtained by stirred mixing of 42 parts of deionized water, 0.72 parts of "AQUALON KH-10", 2.1 parts of methylenebisacrylamide, 2.8 parts of styrene, 16.1 parts of methyl methacrylate, 28 parts of ethyl acrylate and 21 parts of n-butyl acrylate.

Monomer Emulsion (3):

Monomer emulsion (3) was obtained by stirred mixing of 18 parts of deionized water, 0.31 parts of "AQUALON KH-10", 0.03 parts of ammonium persulfate, 5.1 parts of methacrylic acid, 5.1 parts of 2-hydroxyethyl acrylate, 3 parts of styrene, 6 parts of methyl methacrylate, 1.8 parts of ethyl acrylate and 9 parts of n-butyl acrylate.

Production of Polyester Resin for Aqueous Top Coating Composition and Aqueous Base Coat Coating Composition Production Example 13

After charging 109 parts of trimethylolpropane, 141 parts of 1,6-hexanediol, 126 parts of hexahydrophthalic anhydride and 120 parts of adipic acid into a reactor equipped with a thermometer, thermostat, stirrer, reflux condenser and water separator, and heating between 160° C. and 230° C. for a period of 3 hours, condensation reaction was conducted at 230° C. for 4 hours. Next, 38.3 parts of trimellitic anhydride was further added for addition of carboxyl groups to the obtained condensation reaction product, reaction was conducted at 170° C. for 30 minutes, and then dilution was performed with 2-ethyl-1-hexanol to obtain a polyester resin (PE) solution with a solid concentration of 70%. The polyester resin (PE) had an acid value of 46 mgKOH/g, a hydroxyl value of 150 mgKOH/g, a solid concentration of 70% and a weight-average molecular weight of 6,400.

Production of Brightness Pigment Dispersion for Aqueous Base Coat Coating Composition Production Example 14

A brightness pigment dispersion (AL) was obtained by packing 19 parts of the aluminum pigment paste "GX-180A" (trade name of Asahi Kasei Metals Co., Ltd., metal content: 74%), 35 parts of 2-ethyl-1-hexanol, 8 parts of a phosphate group-containing resin solution (*1) and 0.2 part of 2-(dimethylamino)ethanol into a container equipped with a stirrer, and uniformly mixing them.

(*1) Phosphate group-containing resin solution: After placing a mixed solvent comprising 27.5 parts of methoxypropanol and 27.5 parts of isobutanol into a reactor equipped with a thermometer, thermostat, stirrer, reflux condenser, nitrogen inlet tube and dropper and heating it to 110° C., 121.5 parts of a mixture comprising 25 parts of styrene, 27.5 parts of n-butyl methacrylate, 20 parts of "Isostearyl Acrylate" (trade name of Osaka Organic Chemical Industry, Ltd., branched higher alkyl acrylate), 7.5 parts of 4-hydroxybutyl acrylate, 15 parts of a phosphate group-containing polymerizable unsaturated monomer (*2), 12.5 parts of 2-methacryloyloxyethyl acid phosphate, 10 parts of isobutanol and 4 parts of tert-butyl peroxyoctanoate was packed into the reactor over a period of 4 hours, and then a mixture of 0.5 part of tert-butyl peroxyoctanoate and 20 parts of isopropanol was added dropwise to the reactor over a period of 1 hour.

Next, the contents of the reactor were stirred for 1 hour for ageing, to obtain a phosphate group-containing resin solution with a solid concentration of 50%. The acid value due to the phosphate groups of the phosphate group-containing resin was 83 mgKOH/g, the hydroxyl value was 29 mgKOH/g and the weight-average molecular weight was 10,000.

(*2) Phosphate group-containing polymerizable unsaturated monomer: After placing 57.5 parts of monobutylphosphoric acid and 41 parts of isobutanol in a reactor equipped with a thermometer, thermostat, stirrer, reflux condenser, nitrogen inlet tube and dropper and heating them to 90° C., 42.5 parts of glycidyl methacrylate was added dropwise over a period of 2 hours, and further aged for 1 hour while stirring. Next, 59 parts of isopropanol was added to the reactor to obtain a phosphate group-containing polymerizable unsaturated monomer solution with a solid concentration of 50%. The acid value due to the phosphate groups in the obtained monomer was 285 mgKOH/g.

Production of Aqueous Base Coat Coating Composition

Production Example 15

After packing 100 parts of an aqueous dispersion of the water-dispersible hydroxyl-containing acrylic resin (AC) obtained in Production Example 12, 57 parts of the hydroxyl-containing polyester resin (PE) solution obtained in Production Example 13, 62 parts of the brightness pigment dispersion (AL) obtained in Production Example 14 and 37.5 parts of "SAIMEL 325" into a container equipped with a stirrer, the components were uniformly mixed, and then "ACRYSOL ASE-60", 2-(dimethylamino)ethanol and deionized water were added to the container to obtain an aqueous base coat coating composition (Y-1) having pH 8.0, a solid concentration of 25% and a viscosity of 40 seconds with a No. 4 Ford cup at 20° C.

Production of Aqueous Top Coating Composition

Production Example 16

After packing 100 parts of an aqueous dispersion of the water-dispersible hydroxyl-containing acrylic resin (AC) obtained in Production Example 12, 21 parts of the hydroxyl-containing polyester resin (PE) solution obtained in Production Example 13, 114 parts of the pigment-dispersed paste (P-1) obtained in Production Example 9, 35 parts of 2-ethyl-1-hexanol and 37.5 parts of "SAIMEL 325" into a container equipped with a stirrer, the components were uniformly mixed, and then "ACRYSOL ASE-60", 2-(dimethylamino)ethanol and deionized water were added to the container to obtain an aqueous top coating composition (Y-2) having pH 8.0, a solid concentration of 48% and a viscosity of 60 seconds with a No. 4 Ford cup at 20° C.

[Fabrication of Test Sheets]

The aqueous coating compositions (X-1) to (X-21) obtained in Examples 12 to 28 and Comparative Examples 5 to 8, the aqueous base coat coating composition (Y-1) obtained in Production Example 15 and the aqueous top coating composition (Y-2) obtained in Production Example 16 were used to fabricate test sheets in the following manner, and they were evaluated.

[Fabrication of Test Article to be Coated]

A zinc phosphate-treated cold-rolled steel sheet with 300 mm length×450 mm width×0.8 mm thickness was electrodeposited with "ELECRON GT-10" (trade name of Kansai Paint Co., Ltd., cationic electrodeposition coating) to a cured film thickness of 20 μm, and heated at 170° C. for 30 minutes for curing to produce a test article to be coated.

Example 29

Each test article to be coated was electrostatically coated with a freshly produced aqueous coating composition (X-1) obtained in Example 12 using a rotary atomizing electrostatic coater to a cured film thickness of 20 μm, and an uncured intercoating film was formed on the test article to be coated. After standing for 3 minutes, it was preheated at 80° C. for 3 minutes, and then the article to be coated with the uncured intercoating film was electrostatically coated with an aqueous base coat coating composition (Y-1) obtained in Production Example 15 using a rotary atomizing electrostatic coater to a cured film thickness of 15 μm, forming an uncured base coat coating film thereover.

After standing for 3 minutes, it was preheated at 80° C. for 3 minutes, and then the article to be coated with the uncured intercoating film and the uncured base coat coating film was electrostatically coated with "MAGICRON KINO-1210" (trade name of Kansai Paint Co., Ltd., acrylic resin-based organic solvent-type overcoat clear coating, hereunder also referred to as "clear coating (Z-1)") to a cured film thickness of 35 μm, forming an uncured clear coated film thereover. After standing for 7 minutes, the article to be coated was heated at 140° C. for 30 minutes to simultaneously bake the intercoating film, base coat coating film and clear coated film, producing a test sheet 1.

Also, a test sheet 2 for coating material adhesion testing after storage was obtained in the same manner as the method for producing the test sheet 1, except that the freshly produced aqueous coating composition (X-1) was changed to the aqueous coating composition (X-1) after storage for 10 days at 40° C. following production.

Examples 30 to 45 and Comparative Examples 9 to 12

Test sheets were fabricated in the same manner as Example 29, except that the aqueous coating composition (X-1) was changed to aqueous coating compositions (X-2) to (X-21) shown in Table 3 below.

Example 46

Each test article to be coated was electrostatically coated with a freshly produced aqueous coating composition (X-1) obtained in Example 12 using a rotary atomizing electrostatic coater to a film thickness of 20 μm, and an uncured intercoating film was formed on the test article to be coated. After standing for 3 minutes, it was preheated at 80° C. for 3 minutes, and then the article to be coated with the uncured intercoating film was electrostatically coated with an aqueous top coating composition (Y-2) obtained in Production Example 16 using a rotary atomizing electrostatic coater to a film thickness of 35 μm, forming an uncured top coating film thereover.

After standing for 3 minutes, it was preheated at 80° C. for 3 minutes, and then the article to be coated with the uncured intercoating film and uncured top coating film was heated at 140° C. for 30 minutes to simultaneously bake the intercoating film and top coating film, producing a test sheet 1.

Also, a test sheet 2 for coating material adhesion testing after storage was obtained in the same manner as the method for producing the test sheet 1, except that the freshly produced aqueous coating composition (X-1) was changed to the aqueous coating composition (X-1) after storage for 10 days at 40° C. following production.

Examples 47 to 62 and Comparative Examples 13 to 16

Test sheets were fabricated in the same manner as Example 46, except that the aqueous coating composition (X-1) obtained in Example 12 was changed to aqueous coating compositions (X-2) to (X-21) shown in Table 4 below.
[Evaluation]
Each of the test sheets obtained in Examples 29 to 62 and Comparative Examples 9 to 16 was evaluated by the following test method. The results are shown in Table 3 and Table 4 below.
[Test Methods]
Smoothness:
The test sheet 1 was evaluated based on the value of We measured with a "Wave Scan DOI" (trade name of BYK Gardner). A smaller value for We means higher smoothness of the coating surface.
Sharpness:
The test sheet 1 was evaluated based on the value of Wa measured with a "Wave Scan DOI". A smaller value for Wa means higher sharpness of the coating surface.
Water Resistance:
The test sheet 1 was immersed for 240 hours in warm water at 40° C. and then raised and dried at 20° C. for 12 hours, after which the multilayer coating film of test sheet 1 was notched in a lattice-like manner with a cutter reaching to the basis material, to form 100 square grids with sizes of 2 mm×2 mm. Next, adhesive cellophane tape was attached to the surface and the tape was abruptly peeled off at 20° C., after which the residual state of the square grid coating film was examined and evaluated according to the following scale.
VG: 100 of the square grid coating films remained, with no chipping of the edges of the coating films at the edges of the cutter notches.
G: 100 of the square grid coating films remained, but edges of the coating films at the edges of the cutter notches were chipped.
F: 90-99 of the square grid coating films remained.
P: 89 or fewer of the square grid coating films remained.
Adhesion of Coating Material after Storage:
The multilayer coating film of test sheet 2 was notched in a lattice-like manner with a cutter reaching to the basis material, to form 100 square grids with sizes of 2 mm×2 mm. Next, adhesive cellophane tape was attached to the surface and the tape was abruptly peeled off at 20° C., after which the number of remaining square grid coating films was counted. A larger number of square grid coating films remaining indicates higher adhesion even after storage of the coating material.
Also, the remaining square grid coating films were checked for chipping of the edges of the coating films at the edges of the cutter notches. Less chipping of the coating film edges indicates higher adhesion even after storage of the coating material.

TABLE 3

| | | Aqueous coating composition | Aqueous base coat coating composition | Clear coat coating material (Z) | Smoothness | Sharpness | Water resistance | Adhesion of coating material after storage | |
|---|---|---|---|---|---|---|---|---|---|
| | | | | | | | | Number of square grid coating films remaining | Chipping present or absent |
| Example | 29 | X-1 | Y-1 | Z-1 | 7 | 8 | VG | 100 | Absent |
| | 30 | X-2 | Y-1 | Z-1 | 8 | 8 | VG | 100 | Absent |
| | 31 | X-3 | Y-1 | Z-1 | 8 | 8 | VG | 100 | Absent |
| | 32 | X-4 | Y-1 | Z-1 | 7 | 8 | VG | 100 | Absent |
| | 33 | X-5 | Y-1 | Z-1 | 9 | 7 | G | 100 | Absent |
| | 34 | X-6 | Y-1 | Z-1 | 9 | 8 | G | 100 | Absent |
| | 35 | X-7 | Y-1 | Z-1 | 8 | 8 | G | 100 | Present |
| | 36 | X-8 | Y-1 | Z-1 | 6 | 9 | VG | 100 | Present |
| | 37 | X-9 | Y-1 | Z-1 | 8 | 9 | G | 100 | Absent |
| | 38 | X-10 | Y-1 | Z-1 | 7 | 8 | VG | 100 | Absent |
| | 39 | X-11 | Y-1 | Z-1 | 8 | 8 | VG | 100 | Absent |
| | 40 | X-12 | Y-1 | Z-1 | 7 | 8 | G | 100 | Absent |
| | 41 | X-13 | Y-1 | Z-1 | 10 | 10 | G | 100 | Absent |
| | 42 | X-14 | Y-1 | Z-1 | 9 | 9 | G | 100 | Absent |
| | 43 | X-15 | Y-1 | Z-1 | 8 | 7 | G | 100 | Present |
| | 44 | X-16 | Y-1 | Z-1 | 9 | 9 | G | 100 | Absent |
| | 45 | X-17 | Y-1 | Z-1 | 9 | 9 | G | 100 | Absent |
| Comp. Ex. | 9 | X-18 | Y-1 | Z-1 | 13 | 13 | G | 50 | Present |
| | 10 | X-19 | Y-1 | Z-1 | 13 | 13 | G | 50 | Present |
| | 11 | X-20 | Y-1 | Z-1 | 12 | 12 | G | 60 | Present |
| | 12 | X-21 | Y-1 | Z-1 | 13 | 13 | g0 | 0 | — |

TABLE 4

| | | Aqueous coating composition | Aqueous top coat coating composition | Smoothness | Sharpness | Water resistance | Adhesion of coating material after storage | |
|---|---|---|---|---|---|---|---|---|
| | | | | | | | Number of square grid coating films remaining | Chipping present or absent |
| Ex. | 46 | X-1 | Y-2 | 6 | 8 | VG | 100 | Absent |
| | 47 | X-2 | Y-2 | 8 | 9 | VG | 100 | Absent |

TABLE 4-continued

|  |  | Aqueous coating composition | Aqueous top coat coating composition | Smoothness | Sharpness | Water resistance | Adhesion of coating material after storage | |
|---|---|---|---|---|---|---|---|---|
|  |  |  |  |  |  |  | Number of square grid coating films remaining | Chipping present or absent |
|  | 48 | X-3 | Y-2 | 7 | 9 | VG | 100 | Absent |
|  | 49 | X-4 | Y-2 | 7 | 9 | G | 100 | Absent |
|  | 50 | X-5 | Y-2 | 8 | 8 | G | 100 | Absent |
|  | 51 | X-6 | Y-2 | 8 | 9 | G | 100 | Absent |
|  | 52 | X-7 | Y-2 | 8 | 9 | G | 100 | Absent |
|  | 53 | X-8 | Y-2 | 5 | 10 | G | 100 | Absent |
|  | 54 | X-9 | Y-2 | 7 | 10 | G | 100 | Absent |
|  | 55 | X-10 | Y-2 | 7 | 9 | VG | 100 | Absent |
|  | 56 | X-11 | Y-2 | 8 | 9 | VG | 100 | Absent |
|  | 57 | X-12 | Y-2 | 7 | 9 | G | 100 | Absent |
|  | 58 | X-13 | Y-2 | 7 | 10 | G | 100 | Absent |
|  | 59 | X-14 | Y-2 | 8 | 9 | G | 100 | Absent |
|  | 60 | X-15 | Y-2 | 8 | 8 | G | 100 | Absent |
|  | 61 | X-16 | Y-2 | 8 | 10 | G | 100 | Absent |
|  | 62 | X-17 | Y-2 | 8 | 10 | G | 100 | Absent |
| Comp. | 13 | X-18 | Y-2 | 12 | 14 | G | 60 | Present |
| Ex. | 14 | X-19 | Y-2 | 13 | 14 | G | 60 | Present |
|  | 15 | X-20 | Y-2 | 12 | 13 | G | 30 | Present |
|  | 16 | X-21 | Y-2 | 12 | 13 | G | 50 | Present |

The invention claimed is:

1. An aqueous coating composition comprising: a block polyisocyanate compound having a hydrophilic group and at least one block isocyanate group; and a hydroxyl-containing resin (A);
wherein the block isocyanate group in the block polyisocyanate compound is selected from the group consisting of:
a block isocyanate group represented by the following formula (I):

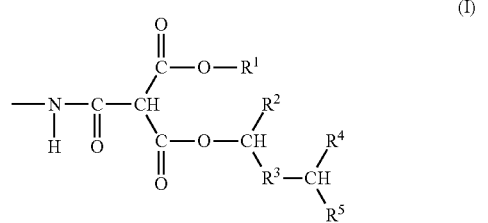

(I)

wherein $R^1$ is an isopropyl group,
$R^2$, $R^4$ and $R^5$ each independently represent a C1-12 hydrocarbon group and
$R^3$ represents a C1-12 straight or branched alkylene group; and
a block isocyanate group represented by the following formula (II):

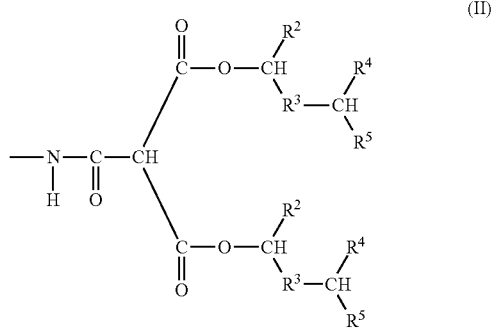

(II)

wherein $R^2$, $R^3$, $R^4$ and $R^5$ are as defined above;

wherein the hydrophilic group in the block polyisocyanate compound comprises at least one polyoxyalkylene group selected from a polyoxyethylene group and a polyoxyethyleneoxypropylene group, and wherein the hydroxyl-containing resin (A) includes a hydroxyl-containing acrylic resin ($A_1$) and a hydroxyl-containing polyester resin ($A_2$), and wherein the hydroxyl-containing acrylic resin ($A_1$) comprises a core-shell-type water-dispersible hydroxyl-containing acrylic resin ($A_{111}$).

2. The aqueous coating composition according to claim 1, wherein the core-shell type water-dispersible hydroxyl-containing acrylic resin ($A_{111}$) has a hydroxyl value in the range of about 1 to about 200 mgKOH/g.

3. The aqueous coating composition according to claim 1, wherein the core-shell type water-dispersible hydroxyl-containing acrylic resin ($A_{111}$) comprises a copolymer as the core section whose copolymerizing components are a polymerizable unsaturated monomer having two or more polymerizable unsaturated groups in the molecule and a polymerizable unsaturated monomer having one polymerizable unsaturated group in the molecule.

4. A coated article with a coating film, obtained by coating an article with the aqueous coating composition according to claim 1.

* * * * *